(12) United States Patent  (10) Patent No.: US 8,803,364 B2
Onishi et al.  (45) Date of Patent: *Aug. 12, 2014

(54) POWER TRANSMISSION CONTROL DEVICE, POWER TRANSMITTING DEVICE, NON-CONTACT POWER TRANSMISSION SYSTEM, ELECTRONIC INSTRUMENT, AND POWER TRANSMISSION CONTROL METHOD

(75) Inventors: Kota Onishi, Nagoya (JP); Masayuki Kamiyama, Nagoya (JP); Nobutaka Shiozaki, Nagoya (JP); Takahiro Kamijo, Fujimi-cho (JP); Minoru Hasegawa, Suwa (JP); Haruhiko Sogabe, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1359 days.

This patent is subject to a terminal disclaimer.

(21) Appl. No.: 12/350,495

(22) Filed: Jan. 8, 2009

(65) Prior Publication Data
US 2009/0174264 A1  Jul. 9, 2009

(30) Foreign Application Priority Data

Jan. 9, 2008  (JP) .................................. 2008-002320
Nov. 7, 2008  (JP) .................................. 2008-286286

(51) Int. Cl.
*H02J 17/00* (2006.01)
(52) U.S. Cl.
USPC ........................................................ 307/104
(58) Field of Classification Search
USPC ........................................................ 307/104
See application file for complete search history.

(56) References Cited

U.S. PATENT DOCUMENTS

| 5,394,105 | A | 2/1995 | Axer |
| 6,028,413 | A | 2/2000 | Brockmann |
| 6,118,249 | A | 9/2000 | Brockmann et al. |
| 6,212,430 | B1 * | 4/2001 | Kung .............................. 607/61 |
| 7,211,986 | B1 | 5/2007 | Flowerdew et al. |
| 7,605,496 | B2 * | 10/2009 | Stevens et al. .................. 307/17 |

(Continued)

FOREIGN PATENT DOCUMENTS

| JP | A-6-169536 | 6/1994 |
| JP | A-10-260209 | 9/1998 |

(Continued)

OTHER PUBLICATIONS

Machine translation for JP11-122832.*

(Continued)

*Primary Examiner* — Fritz M Fleming
(74) *Attorney, Agent, or Firm* — Oliff PLC

(57) ABSTRACT

A power transmission control device provided in a power transmitting device of a non-contact power transmission system includes a power-transmitting-side control circuit that controls power transmission to a power receiving device, the power-transmitting-side control circuit causing the power transmitting device to perform intermittent temporary power transmission, detecting a response from the power receiving device that has received the power due to the temporary power transmission to automatically detect installation of a power-receiving-side instrument that includes the power receiving device in an area in which power transmitted via non-contact power transmission can be received, and causing the power transmitting device to perform continuous normal power transmission to the power receiving device when the installation of the power-receiving-side instrument has been detected. A foreign object detection process may also be performed in combination.

5 Claims, 19 Drawing Sheets

(56) References Cited

U.S. PATENT DOCUMENTS

| | | | |
|---|---|---|---|
| 8,198,754 B2* | 6/2012 | Iisaka et al. | 307/104 |
| 2003/0078634 A1* | 4/2003 | Schulman et al. | 607/61 |
| 2004/0145342 A1 | 7/2004 | Lyon | |
| 2004/0233043 A1* | 11/2004 | Yazawa et al. | 340/10.3 |
| 2005/0151511 A1* | 7/2005 | Chary | 320/127 |
| 2007/0182367 A1 | 8/2007 | Partovi | |
| 2008/0197712 A1 | 8/2008 | Jin et al. | |
| 2009/0001818 A1 | 1/2009 | Iisaka et al. | |
| 2009/0001932 A1 | 1/2009 | Kamijo et al. | |
| 2009/0009006 A1 | 1/2009 | Jin et al. | |
| 2009/0026844 A1 | 1/2009 | Iisaka et al. | |
| 2009/0127936 A1 | 5/2009 | Kamijo et al. | |

FOREIGN PATENT DOCUMENTS

| | | | |
|---|---|---|---|
| JP | 11122832 A * | 4/1999 | |
| JP | A-2001-8450 | 1/2001 | |
| JP | A-2001-128375 | 5/2001 | |
| JP | A-2001-218391 | 8/2001 | |
| JP | A-2001-275280 | 10/2001 | |
| JP | A-2002-209344 | 7/2002 | |
| JP | A-2002-221567 | 8/2002 | |
| JP | A-2005-237155 | 9/2005 | |
| JP | A-2006-060909 | 3/2006 | |
| JP | A-2006-141170 | 6/2006 | |
| JP | A-2006-230032 | 8/2006 | |
| JP | A-2006-230129 | 8/2006 | |
| JP | A-2007-231567 | 9/2007 | |

OTHER PUBLICATIONS

U.S. Appl. No. 12/350,511, filed Jan. 8, 2009 in the name of Kota Onishi et al.

Mar. 30, 2012 European Search Report issued in European Patent Application No. 09 00 0209.

* cited by examiner

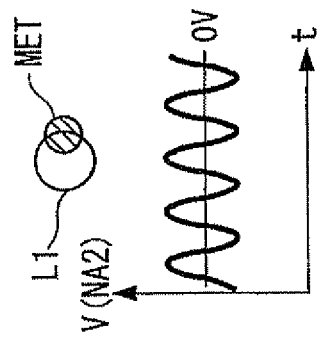
FIG. 13A
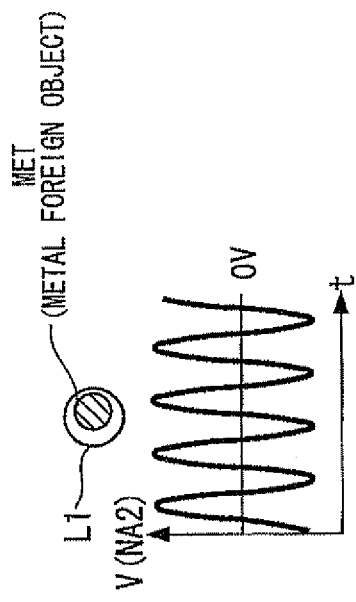
FIG. 13B
FIG. 13C
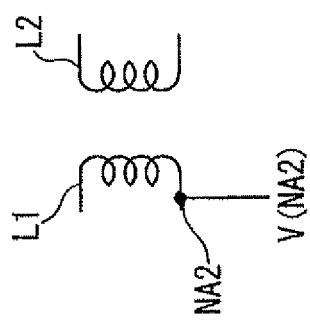
FIG. 13D
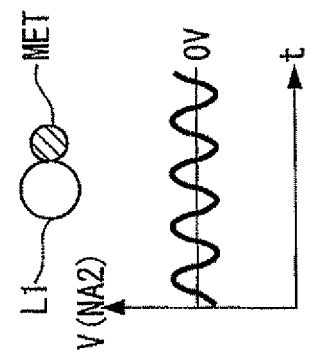
FIG. 13E
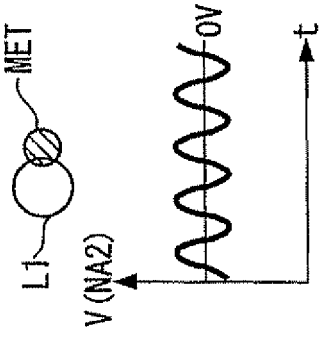
FIG. 13F
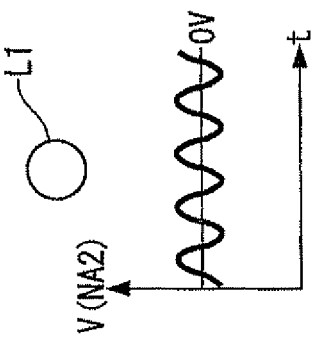

FIG. 19A
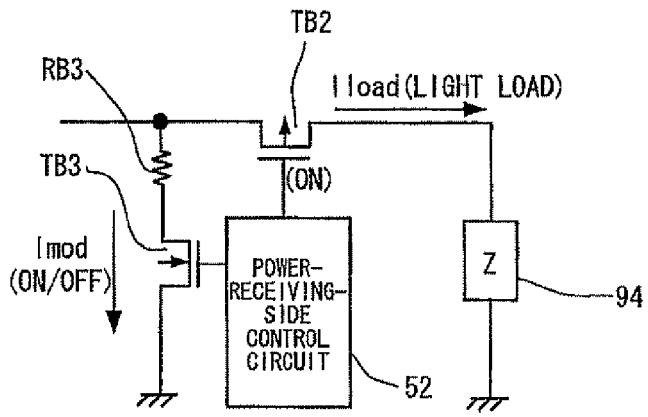
FIG. 19B
FIG. 19C
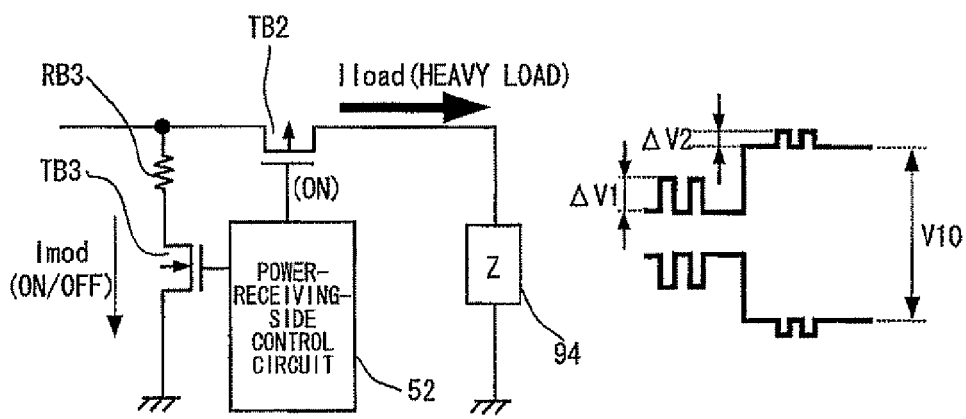
FIG. 19D
FIG. 19E
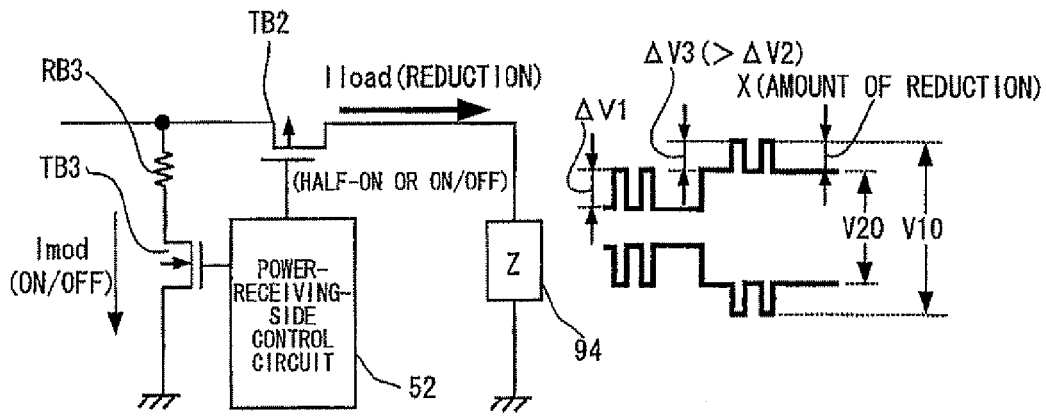

POWER TRANSMISSION CONTROL DEVICE, POWER TRANSMITTING DEVICE, NON-CONTACT POWER TRANSMISSION SYSTEM, ELECTRONIC INSTRUMENT, AND POWER TRANSMISSION CONTROL METHOD

Japanese Patent Application No. 2008-2320 filed on Jan. 9, 2008 and Japanese Patent Application No. 2008-286286 filed on Nov. 7, 2008, are hereby incorporated by reference in their entirety.

BACKGROUND

The present invention relates to a power transmission control device, a power transmitting device, a non-contact power transmission system, an electronic instrument, a power transmission control method, and the like.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., cordless telephone handset or watch), and the like have been proposed.

JP-A-2006-60909 discloses a non-contact power transmission device using a primary coil and a secondary coil, for example.

A non-contact power transmitting device is strongly desired to consume only a small amount of power in order to increase the life of a battery of an electronic instrument, for example. Therefore, it is important to suppress unnecessary power transmission from a power-transmitting-side instrument to a power-receiving-side instrument as much as possible.

A non-contact power transmitting device is desired to achieve a high degree of safety and reliability. For example, when power is transmitted to a non-standard power-receiving-side instrument, the instrument may break down.

Even when power is transmitted to a power-receiving-side instrument that conforms to a specific standard, power transmission must be stopped when the power transmission environment is inappropriate. For example, when power is transmitted in a state in which a metal foreign object is present, abnormal heat generation may occur In this case, power transmission must be stopped. A metal foreign object may be small or medium-sized, or may be large (e.g., a thin sheet that is present over the entire area between a power-transmitting-side instrument and a power-receiving-side instrument). Therefore, it is desirable to take appropriate safety measures irrespective of the size or type of foreign object.

A non-contact power transmitting device is also desired to improve convenience to the user. Moreover, it is important to reduce the size and the cost of a non-contact power transmitting device by reducing the number of parts.

SUMMARY

According to one aspect of the invention, there is provided a power transmission control device provided in a power transmitting device of a non-contact power transmission system, the non-contact power transmission system performing non-contact power transmission from the power transmitting device to a power receiving device via a primary coil and a secondary coil that are electromagnetically coupled, the power transmission control device comprising:

a power-transmitting-side control circuit that controls power transmission to the power receiving device, the power-transmitting-side control circuit causing the power transmitting device to perform intermittent temporary power transmission, detecting a response from the power receiving device that has received the temporary power transmission to detect installation of a power-receiving-side instrument that includes the power receiving device in an area in which power transmitted via non-contact power transmission can be received, causing the power transmitting device to perform continuous normal power transmission to the power receiving device when the installation of the power-receiving-side instrument has been detected, and causing the power transmitting device to continuously perform the intermittent temporary power transmission when the installation of the power-receiving-side instrument has not been detected.

According to another aspect of the invention, there is provided a power transmission control device provided in a power transmitting device that transmits power to a power receiving device, the power transmission control device comprising:

a position detection section that detects a position of the power receiving device; and a power transmission control section that controls an operation of the power transmitting device, the power transmission control section causing the power transmitting device to perform intermittent power transmission, causing the power transmitting device to perform continuous power transmission when the position detection section has detected a response from the power receiving device that has received the intermittent the power transmission, and causing the power transmitting device to continuously perform the intermittent power transmission when the position detection section does not detect the response.

According to another aspect of the invention, there is provided a power transmitting device comprising:

one of the above power transmission control devices; and a power transmitting section that generates an alternating-current voltage and supplies the alternating-current voltage to the primary coil.

According to another aspect of the invention, there is provided a non-contact power transmission system comprising a power transmitting device and a power receiving device, the non-contact power transmission system performing non-contact power transmission from the power transmitting device to the power receiving device via a primary coil and a secondary coil that are electromagnetically coupled, the power transmitting device including a power-transmitting-side control circuit that controls power transmission to the power receiving device based on an induced voltage in the primary coil;

the power receiving device including a power supply control section that controls power supply to a load, and a power reception control device that includes a power-receiving-side control circuit that controls the power receiving device; and the power-transmitting-side control circuit of the power transmitting device causing the power transmitting device to perform intermittent temporary power transmission, detecting a response from the power receiving device that has received the power due to the temporary power transmission to detect installation of a power-receiving-side instrument that includes the power receiving device in an area in which power transmitted via non-contact power transmission can be received, causing the power transmitting device to perform continuous normal power transmission to the power receiving device when the installation of the power-receiving-side instrument has been detected, and causing the power transmitting device to continuously perform the intermittent temporary power transmission when the installation of the power-receiving-side instrument has not been detected.

According to another aspect of the invention, there is provided an electronic instrument comprising the above power transmitting device.

According to another aspect of the invention, there is provided a power transmission control method that controls power transmission from a power transmitting device to a power receiving device, the method comprising:

causing the power transmitting device to perform intermittent temporary power transmission;

causing the power receiving device that has received the intermittent temporary power transmission to transmit a response to the power transmitting device;

causing the power transmitting device to detect the response to detect installation of the power receiving device in an area in which power transmitted via non-contact power transmission can be received;

causing the power transmitting device to perform continuous normal power transmission when the installation of the power receiving device has been detected; and causing the power transmitting device to perform intermittent power transmission when the installation of the power receiving device has not been detected.

BRIEF DESCRIPTION OF THE DRAWINGS

FIGS. 13A to 13F are views illustrative of the principle of metal foreign object (conductive foreign object) detection.

FIGS. 19A to 19E are views illustrative of a load reduction operation.

DESCRIPTION OF EXEMPLARY EMBODIMENTS

Figure 1A:
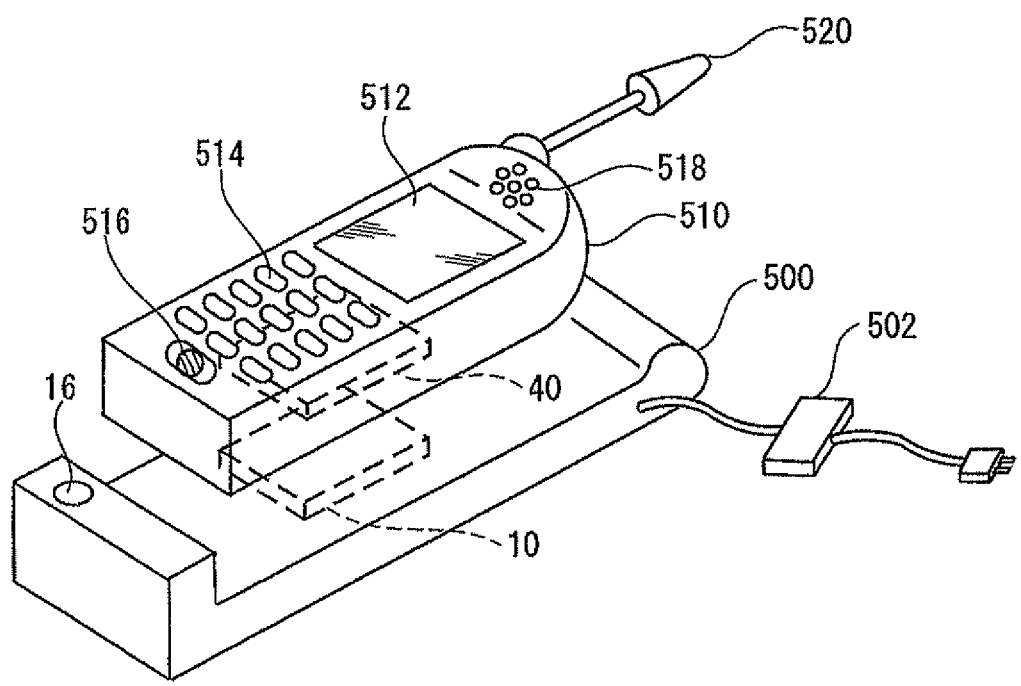
FIGS. 1A and 1B are views illustrative of examples of an electronic instrument to which non-contact power transmission technology is applied, and the principle of non-contact power transmission using an induction transformer.

Several embodiments of the invention may provide non-contact power transmission technology that improves convenience to the user and reduce power consumption, for example. Several embodiments of the invention may provide highly reliable non-contact power transmission technology provided with appropriate safety measures, for example At least one embodiment of the invention may reduce the size and cost of a non-contact power transmission system by reducing the number of parts, for example.

(1) According to one embodiment of the invention, there is provided a power transmission control device provided in a power transmitting device of a non-contact power transmission system, the non-contact power transmission system performing non-contact power transmission from the power transmitting device to a power receiving device via a primary coil and a secondary coil that are electromagnetically coupled, the power transmission control device comprising:

a power-transmitting-side control circuit that controls power transmission to the power receiving device, the power-transmitting-side control circuit causing the power transmitting device to perform intermittent temporary power transmission, detecting a response from the power receiving device that has received the temporary power transmission to detect installation of a power-receiving-side instrument that includes the power receiving device in an area in which power transmitted via non-contact power transmission can be received, causing the power transmitting device to perform continuous normal power transmission to the power receiving device when the installation of the power-receiving-side instrument has been detected, and causing the power transmitting device to continuously perform the intermittent temporary power transmission when the installation of the power-receiving-side instrument has not been detected.

The power transmitting device performs intermittent temporary power transmission, and automatically detects installation of the power-receiving-side instrument by detecting a response from the power receiving device that has received temporary power transmission. Normal power transmission does not start when installation of the power-receiving-side instrument has not been detected. When installation of the power-receiving-side instrument has not been detected, the power transmitting device performs intermittent temporary power transmission and waits for installation of the power-receiving-side instrument (initial state). The above-described series of operations is automatically repeated, for example. It suffices that the user merely set the power-receiving-side instrument (power receiving device) without operating a switch or the like. Therefore, convenience to the user is significantly improved.

Since temporary power transmission is performed intermittently, a minimum amount of power is required. Therefore, power consumption can be reduced. The term "temporary power transmission" refers to power transmission (e.g., intermittent power transmission) performed before normal power transmission to the power receiving device. The power transmission frequency during temporary power transmission may be the same as or differ from the power transmission frequency during normal power transmission. The term "normal power transmission" refers to power transmission (e.g., power transmission for charging a battery (i.e., load)) according to the original objective (i.e., power supply to the load of the power receiving device).

(2) In the power transmission control device,
the power-transmitting-side control circuit may perform an ID authentication process when the installation of the power-receiving-side instrument has been detected, and may cause the power transmitting device to perform normal power transmission when the ID authentication process has been completed successfully.

According to this embodiment, the ID authentication process is performed before normal power transmission. This reliably prevents a situation in which power is unnecessarily transmitted to an inappropriate target. Specifically, when the ID authentication process has not been completed successfully, the power-receiving-side instrument that has been set is an inappropriate power transmission target. Therefore, the power transmitting device performs intermittent temporary power transmission (initial state) without performing normal power transmission. This reliably prevents a situation in which power is transmitted to an inappropriate target so that the reliability and the safety of the non-contact power transmission system are improved.

The ID authentication information may include a manufacturer number, instrument ID number, rating information, and the like.

(3) In the power transmission control device,
the power-transmitting-side control circuit may detect the installation of the power-receiving-side instrument depending on whether or not ID authentication information has been received from the power receiving device within a given period of time from a start time of the temporary power transmission.

The power-transmitting-side control circuit detects installation of the power-receiving-side instrument on condition that the ID authentication information has been received from the power receiving device within a given period of time from the start time of temporary power transmission. Specifically, when the power-receiving-side instrument has been installed, the ID authentication information is transmitted from the power-receiving-side instrument within a given period of time when performing temporary power transmission. Therefore, installation of the power-receiving-side instrument can be detected by determining whether or not the ID authentication information has been transmitted from the power-receiving-side instrument within a given period of time.

(4) In the power transmission control device,
the power-transmitting-side control circuit may determine the presence or absence of a foreign object based on a change in waveform of an induced voltage signal of the primary coil, and may cause the power transmitting device to stop the normal power transmission and perform the intermittent temporary power transmission when a foreign object has been detected during the normal power transmission.

The power-transmitting-side control circuit detects whether or not a foreign object (conductive foreign object such as a metal foreign object) is present during normal power transmission. The power-transmitting-side control circuit causes the power transmitting device to stop normal power transmission and return to the initial state (i.e., a state in which the power transmitting device performs intermittent temporary power transmission) when a foreign object has been detected. Since abnormal heat generation, a skin burn, ignition, or the like may occur when a foreign object is inserted between the primary coil and the secondary coil, measures against a foreign object are important. For example, since the power-receiving-side load with respect to the power-transmitting-side instrument increases when a foreign object is present, the waveform of the induced voltage signal of the primary coil changes. Therefore, a foreign object can be detected using a circuit having a simple configuration by utilizing this principle. The safety and the reliability of the non-contact power transmission system are remarkably improved by taking measures against a foreign object.

(5) In the power transmission control device,
the power-transmitting-side control circuit may detect removal of the power-receiving-side instrument based on a change in waveform of an induced voltage signal of the primary coil, and may cause the power transmitting device to stop the normal power transmission and perform the intermittent temporary power transmission when removal of the power-receiving-side instrument has been detected during the normal power transmission.

When the power-receiving-side instrument has been removed during normal power transmission, the primary coil and the secondary coil are decoupled, so that the mutual inductance due to coupling is lost, and a resonance occurs corresponding to only the inductance of the primary coil. As a result, since the resonance frequency increases and approach the transmission frequency, a current easily flows through the power transmission coil, whereby the load with respect to the power-transmitting-side instrument increases (i.e., the induced voltage increases). Specifically, the waveform of the induced voltage signal of the primary coil changes.

Therefore, removal of the power-receiving-side instrument can be detected using a circuit having a simple configuration by utilizing this principle. When performing regular load authentication for takeover detection, removal of the power-receiving-side instrument can be detected by detecting interruption of regular load authentication during normal power transmission. Unnecessary power consumption does not occur by detecting removal of the power-receiving-side instrument during normal power transmission. Therefore, a reduction in power consumption and an improvement in safety and reliability can be achieved.

(6) In the power transmission control device,
the power-transmitting-side control circuit may detect the presence or absence of a takeover state in which the power transmitting device continuously performs the normal power transmission while regarding a foreign object placed between the primary coil and the secondary coil as the power-receiving-side instrument, and may cause the power transmitting device to stop the normal power transmission and perform the intermittent temporary power transmission when the takeover state has been detected during the normal power transmission.

The takeover state is detected during normal power transmission to further improve safety and the reliability of the non-contact power transmission system. The takeover state is considered to be a special form of foreign object insertion. The takeover state refers to a state in which the power-transmitting-side instrument continuously performs normal power transmission while erroneously regarding a foreign object as the power-receiving-side instrument.

For example, when a thin metal sheet has been inserted between the primary coil and the secondary coil to block the primary coil and the secondary coil, since a considerable load is always present with respect to the power-transmitting-side instrument, it is difficult to detect removal of the power-receiving-side instrument, for example. Specifically, since the power transmitting device detects a load corresponding to the power-receiving-side instrument after the power-receiving-side instrument has been removed, the power transmitting device cannot detect removal of the power-receiving-side instrument and cannot stop normal power transmission. In this case, the temperature of the metal sheet may increase to a large extent, whereby abnormal heat generation, ignition, instrument breakdown, a skin burn, or the like may occur.

According to this embodiment, the power transmission control device is provided with a takeover detection function in addition to the foreign object detection function and the removal detection function, and the power transmission control device promptly stops normal power transmission when the takeover state has been detected. This further improves the safety and the reliability of the non-contact power transmission system.

(7) In the power transmission control device, the power-transmitting-side control circuit may detect the takeover state when detecting that a signal transmitted from the power receiving device is blocked by the foreign object and does not reach the power transmitting device.

When the takeover state has occurred, signal transmission from the power-receiving-side instrument to the power-transmitting-side instrument is blocked by the foreign object so that the signal cannot reach the power-transmitting-side instrument. Whether or not the takeover state has occurred is detected by transmitting a signal from the power-receiving-side instrument to the power-transmitting-side instrument and determining whether or not the power-transmitting-side instrument can detect the signal by utilizing this principle. For example, the power receiving device transmits a signal (physical signal) to the power transmitting device by means of load modulation through the secondary coil and the primary coil, and whether or not the takeover state has occurred is detected by determining whether or not the power transmitting device can detect the signal (physical signal).

Note that the takeover state detection method is not limited thereto. For example, a light-emitting means may be provided in the power receiving device, and a light-receiving means may be provided in the power transmitting device. Whether or not the takeover state has occurred may be detected by determining whether or not the power transmitting device can detect light (including infrared light) emitted from the power receiving device. Alternatively, whether or not external light (ambient light) reaches the power transmitting device without being blocked by a foreign object may be detected. Whether or not the takeover state has occurred may be detected by determining whether or not the power transmitting device can detect sound from the power receiving device at a predetermined level instead of utilizing an electrical signal or light.

(8) In the power transmission control device, the power-transmitting-side control circuit may detect an intermittent change in a power-receiving-side load with respect to the power transmitting device, and may detect the presence or absence of the takeover state based on the presence or absence of an intermittent change in the power-receiving-side load during the normal power transmission.

The power receiving device causes the load modulation section to intermittently change the load when ID authentication has completed and normal power transmission is performed (e.g., when a charging current is supplied to a battery pack (i.e., load)). Since the power receiving device intermittently changes the load at a given timing (i.e., a timing known to the power transmitting device; a regular timing, for example), the power transmitting device can always detect an intermittent change in the load of the power receiving device during normal power transmission unless a foreign object is inserted. Therefore, the power transmitting device can determine that a foreign object has been inserted when the power transmitting device cannot detect an intermittent change in the load of the power receiving device.

The load modulation section included in the power receiving device is provided to transmit information to the power transmitting device. Since the load modulation section is utilized to detect a foreign object, dedicated hardware need not be provided to detect a foreign object. Since the load modulation method is employed as a communication means from the power receiving device, the power transmitting device necessarily has a configuration which detects a change in load. The power transmitting device can determine whether or not a foreign object has been inserted by merely operating the configuration which detects a change in load during normal power transmission. Therefore, it is unnecessary to provide additional hardware in the power transmitting device.

A change in the load of the power receiving device can be relatively easily detected by detecting a change in waveform of the induced voltage signal of the primary coil, for example (note that the detection method is not limited thereto). A change in the load of the power receiving device can be accurately detected by normal digital signal processing. Since the signal generated due to load modulation is transmitted from the power receiving device to the power transmitting device utilizing the same path as the path used for normal power transmission (i.e., the path through the primary coil and the secondary coil), a dedicated transmission path for the signal which enables detection of insertion of a foreign object need not be provided.

Therefore, it is possible to accurately detect insertion (takeover) of a relatively large foreign object between the primary coil and the secondary coil by simple signal processing while reducing the number of parts by forming a non-contact power transmission system.

(9) In the power transmission control device, the power-receiving-side load with respect to the power transmitting device may be cyclically changed during the normal power transmission due to load modulation of the power receiving device; and the power-transmitting-side control circuit may detect the presence or absence of the takeover state by determining whether or not the change in the power-receiving-side load can be detected over a given number of cycles.

In order to carefully detect whether or not the takeover state has occurred, the power-transmitting-side control circuit detects a change in power-receiving-side load in cycle units, and causes the power transmitting device to stop normal power transmission when the power-transmitting-side control circuit cannot detect a change in load over a given number of cycles (e.g., three cycles). This increases the detection accuracy of insertion of a foreign object that causes a takeover, thereby preventing a situation in which the power-transmitting-side control circuit erroneously stops normal power transmission when a change in load cannot be detected due to an accidental factor.

(10) In the power transmission control device, the power-transmitting-side control circuit may cause the power transmitting device to stop the normal power transmission and perform power transmission for removal detection after full-charging and power transmission for recharge necessity determination after full-charging when a full-charge notification transmitted from the power receiving device has been detected during the normal power transmission, may cause the power transmitting device to perform the intermittent temporary power transmission when removal of the power receiving device has been detected based on a signal transmitted from the power receiving device that has received the power transmission for removal detection after full-charging, and may cause the power transmitting device to resume the normal power transmission when the power-transmitting-side control circuit has determined that recharging is necessary based on a signal transmitted from the power receiving device that has received the power transmission for recharge necessity determination after full-charging.

The power-transmitting-side control circuit monitors the load state after the load of the power-receiving-side instrument has been fully charged to automatically manage recharging. Specifically, when the power-receiving-side instrument remains after full-charging, the load (battery) is discharged with the passage of time so that recharging may be required. Therefore, the power-transmitting-side control circuit causes the power transmitting device to perform power transmission other than normal power transmission (may be intermittent power transmission or weak continuous power transmission at a different frequency) after a full-charge state has been detected to automatically determine whether or not the load must be recharged, and causes the power transmitting device to resume normal power transmission when recharging is necessary. This enables the load to be automatically recharged. Accordingly, even if the power-receiving-side instrument is allowed to stand for a long time after full-charging, the battery has been necessarily fully charged when the user uses the power-receiving-side instrument. This prevents a situation in which the battery becomes charged insufficiently due to discharge. Therefore, convenience to the user can be improved.

Note that it is unnecessary to manage recharging when the power-receiving-side instrument has been removed after full-charging. Therefore, power transmission (may be intermittent power transmission or weak continuous power transmission at a different frequency) for removal detection after full-charging is also performed. It may be determined that the power-receiving-side instrument has been removed when no response is transmitted from the power-receiving-side instrument after intermittent power transmission for removal detection has been performed.

When removal of the power-receiving-side instrument has been detected, the power transmitting device returns to the initial state. The term "full charge" used herein may be broadly interpreted as "a state in which the load of the power receiving device is in a given state", for example. Therefore, the term "load" is not limited to a battery. For example, a given circuit of the power-receiving-side instrument may serve as a load. For example, a state in which a given circuit that has operated by receiving power from the power transmitting device need not operate corresponds to a state in which the load has been fully charged. Such a case is also included in the technical scope of the aspect of the invention.

(11) In the power transmission control device, the power transmission for removal detection after full-charging may be intermittent power transmission in a first cycle;

the power transmission for recharge necessity determination after full-charging may be intermittent power transmission in a second cycle; and the first cycle may be longer than a cycle of the intermittent temporary power transmission, and the second cycle may be longer than the first cycle.

It is desirable to intermittently perform power transmission after full-charging in an appropriate cycle from the viewpoint of reducing power consumption. It is unnecessary to frequently perform intermittent power transmission for removal detection and intermittent power transmission for recharge management. It is desirable to perform intermittent power transmission for removal detection and intermittent power transmission for recharge management in an appropriate cycle in order to prevent an unnecessary increase in power consumption. According to this embodiment, intermittent power transmission for removal detection is performed in the first cycle, and intermittent power transmission for recharge management is performed in the second cycle. The first cycle and the second cycle are provided because it is desirable to optimize the cycle corresponding to the objective.

It is desirable that the cycle of intermittent temporary power transmission in the initial state be very short (e.g., 1 second or less) in order to quickly detect installation of the power-receiving-side instrument. On the other hand, the cycle of removal detection after full-charging may be longer than the cycle of temporary power transmission. Specifically, unnecessary power consumption increases if removal detection is frequently performed. Therefore, the first cycle of power transmission for removal detection after full-charging is set at a value (e.g., several minutes) longer than the cycle of temporary power transmission to suppress an increase in power consumption.

Whether or not recharging after full-charging is necessary may be detected at a lower frequency as compared with removal detection after full-charging (i.e., it takes time until the battery that has been fully charged is discharged so that recharging becomes necessary, and no practical problem occurs even if determination as to whether or not recharging is necessary is delayed to some extent). Therefore, the second cycle of power consumption for full-charge detection is set at a value (e.g., about several minutes) longer than the first cycle. This enables intermittent power transmission to be performed in a cycle corresponding to the objective so that power consumption can be minimized.

(12) According to another embodiment of the invention, there is provided a power transmission control device provided in a power transmitting device that transmits power to a power receiving device, the power transmission control device comprising:

a position detection section that detects a position of the power receiving device; and a power transmission control section that controls an operation of the power transmitting device, the power transmission control section causing the power transmitting device to perform intermittent power transmission, causing the power transmitting device to perform continuous power transmission when the position detection section has detected a response from the power receiving device that has received the intermittent power transmission, and causing the power transmitting device to continuously perform the intermittent power transmission when the position detection section does not detect the response.

According to this embodiment, the power transmission control device is provided in the power transmitting device that transmits power to the power receiving device. The power transmitting device performs intermittent power transmission. The position detection section detects a response from the power receiving device that has received intermittent power transmission. The power transmitting device starts continuous power transmission when the position detection section has detected a response from the power receiving device, and continuously performs intermittent power transmission without starting continuous power transmission when the position detection section has not detected a response from the power receiving device. It suffices that the user merely set the power-receiving-side instrument (power receiving device) without operating a switch or the like. Therefore, convenience to the user is significantly improved. Since a small amount of power is consumed during intermittent power transmission, power consumption can be reduced.

(13) According to another embodiment of the invention, there is provided a power transmitting device comprising:
one of the above power transmission control devices; and
a power transmitting section that generates an alternating-current voltage and supplies the alternating-current voltage to the primary coil.

A novel power transmitting device that has a function of performing a basic sequence for automatically detecting installation of the power-receiving-side instrument and automatically supplying power to the load is thus implemented. A novel advanced power transmitting device that can automatically perform recharge management after full-charging (and removal detection after full-charging) in addition to automatically detecting installation of the power-receiving-side instrument is also implemented.

(14) According to another embodiment of the invention, there is provided a non-contact power transmission system comprising a power transmitting device and a power receiving device, the non-contact power transmission system performing non-contact power transmission from the power transmitting device to the power receiving device via a primary coil and a secondary coil that are electromagnetically coupled,
the power transmitting device including a power-transmitting-side control circuit that controls power transmission to the power receiving device based on an induced voltage in the primary coil;
the power receiving device including a power supply control section that controls power supply to a load, and a power reception control device that includes a power-receiving-side control circuit that controls the power receiving device; and
the power-transmitting-side control circuit of the power transmitting device causing the power transmitting device to perform intermittent temporary power transmission, detecting a response from the power receiving device that has received the power due to the temporary power transmission to detect installation of a power-receiving-side instrument that includes the power receiving device in an area in which power transmitted via non-contact power transmission can be received, causing the power transmitting device to perform continuous normal power transmission to the power receiving device when the installation of the power-receiving-side instrument has been detected, and causing the power transmitting device to continuously perform the intermittent temporary power transmission when the installation of the power-receiving-side instrument has not been detected.

A novel power transmitting device that has a function of performing a reasonable basic sequence for automatically detecting installation of the power-receiving-side instrument and automatically supplying power to the load on condition that installation of the power-receiving-side instrument has been detected is thus implemented. The non-contact power transmission system according to this embodiment is convenient to the user, and has reduced power consumption, high reliability, and excellent safety.

(15) In the non-contact power transmission system,
the power-transmitting-side control circuit may cause the power transmitting device to perform intermittent temporary power transmission to the power receiving device, may detect the installation of the power-receiving-side instrument depending on whether or not ID authentication information as the response from the power receiving device has been received within a given period of time from a start time of the temporary power transmission, may perform an ID authentication process on the power receiving device using the received ID authentication information when the installation of the power-receiving-side instrument has been detected, may cause the power transmitting device to perform continuous normal power transmission to the power receiving device when the ID authentication process has been completed successfully, and may cause the power transmitting device to perform the intermittent temporary power transmission to the power receiving device when the installation of the power-receiving-side instrument has not been detected or the ID authentication process has not been completed successfully.

A novel power transmitting device that has a function of performing a reasonable basic sequence for automatically detecting installation of the power-receiving-side instrument and automatically supplying power to the load on condition that the ID authentication process has been completed successfully is thus implemented. The non-contact power transmission system according to this embodiment is convenient to the user, and has reduced power consumption, high reliability, and excellent safety.

(16) In the non-contact power transmission system,
the power-transmitting-side control circuit may determine the presence or absence of a foreign object during the normal power transmission based on a change in waveform of an induced voltage signal of the primary coil, and may cause the power transmitting device to stop the normal power transmission and perform the intermittent temporary power transmission when a foreign object has been detected.

Since abnormal heat generation, a skin burn, ignition, or the like may occur when a foreign object is inserted between the primary coil and the secondary coil, measures against a foreign object are important. For example, since the power-receiving-side load with respect to the power-transmitting-side instrument increases when a foreign object is present, the waveform of the induced voltage signal of the primary coil changes. Therefore, a foreign object can be detected using a circuit having a simple configuration by utilizing this principle. The safety and the reliability of the non-contact power transmission system are remarkably improved by taking measures against a foreign object.

(17) In the non-contact power transmission system,
the power receiving device may further include a load modulation section, the power-receiving-side control circuit may cause the load modulation section to regularly perform regular load modulation after the normal power transmission has started; and
the power-transmitting-side control circuit of the power transmitting device may detect a regular change in a power-receiving-side load with respect to the power transmitting device, and may cause the power transmitting device to stop the normal power transmission when the regular change in the power-receiving-side load has not been detected during the normal power transmission.

Measures against the takeover state are implemented by regular load authentication after normal power transmission has started. Therefore, the reliability and the safety of the non-contact power transmission system are remarkably improved.

(18) In the non-contact power transmission system, the power receiving device may further include a full-charge detection section that detects whether or not the load has been fully charged;

the power-receiving-side control circuit may cause the load modulation section to perform load modulation and transmit a full-charge notification to the power transmitting device when the full-charge detection section has detected that the load has been fully charged; and the power-transmitting-side control circuit may cause the power transmitting device to stop the normal power transmission and perform first-cycle intermittent power transmission for removal detection after full-charging and second-cycle intermittent power transmission for recharge necessity determination after full-charging when the full-charge notification transmitted from the power receiving device has been detected during the normal power transmission, may cause the power transmitting device to perform the intermittent temporary power transmission when removal of the power receiving device has been detected based on a signal transmitted from the power receiving device that has received the first-cycle intermittent power transmission for removal detection after full-charging, and may cause the power transmitting device to resume the normal power transmission when it has been determined that recharging is necessary based on a signal transmitted from the power receiving device that has received the second-cycle intermittent power transmission for recharge necessity determination after full-charging.

A non-contact power transmission system that monitors the load state after the load of the power-receiving-side instrument has been fully charged to automatically manage recharging is thus implemented. Therefore, a non-contact power transmission system with improved convenience is implemented.

(19) In the non-contact power transmission system, the power-receiving-side control circuit may cause the power supply control section to perform a load reduction process that compulsorily reduces an amount of power supplied the load to apparently reduce the load when causing the load modulation section to perform the regular load modulation during the normal power transmission.

In the non-contact power transmission system according to this embodiment, the power receiving device performs the load reduction process when performing intermittent load modulation. When performing load modulation for detecting the takeover state without stopping power transmission to the load, signal transmission to the power transmitting device due to load modulation is necessarily affected by the state of power supply to the load (i.e., the load state). For example, even if a small current is turned ON/OFF for load modulation when a large amount of charging current is supplied to the load (e.g., battery pack), since the amount of ON/OFF current is smaller than the amount of charging current supplied to the load, it is difficult for the power transmitting device to detect a change in load due to load modulation.

According to this embodiment, the power receiving device monitors the load state of the load (e.g., battery pack) during normal power transmission, and optionally (or uniformly) reduces (or temporarily stops) power supplied to the load when the power receiving device performs load modulation that enables detection of the takeover state. Since the load state of the load is apparently reduced by reducing the amount of power supplied to the load (or temporarily stopping power supply), the power transmitting device can easily detect a signal due to load modulation. Therefore, the foreign object detection accuracy is maintained at a desired level even when the load is heavy. Since at least a minimum amount of power is always supplied to the load even when compulsorily reducing the load, a problem in which the electronic circuit of the load cannot operate does not occur. Moreover, since load modulation which enables detection of insertion of a foreign object is intermittently performed at appropriate intervals taking the effect on power supplied to the load into consideration, as stated above, power supply to the load is not adversely affected even if the load is compulsorily reduced (for example, a problem in which the charging time of the battery pack increases to a large extent does not occur).

The load change detection accuracy of the power transmitting device can be maintained at a desired level, even when the load is heavy, by causing the power receiving device to monitor the load state and reduce the load state of the load when performing load modulation that enables detection of the takeover state (insertion of a large foreign object).

(20) According to another embodiment of the invention, there is provided an electronic instrument comprising the above power transmitting device.

This makes it possible to provide a high-performance electronic instrument with low power consumption and improved safety and reliability.

(21) According to another embodiment of the invention, there is provided a power transmission control method that controls power transmission from a power transmitting device to a power receiving device, the method comprising:

causing the power transmitting device to perform intermittent temporary power transmission;

causing the power receiving device that has received the intermittent temporary power transmission to transmit a response to the power transmitting device;

causing the power transmitting device to detect the response to detect installation of the power receiving device in an area in which power transmitted via non-contact power transmission can be received;

causing the power transmitting device to perform continuous normal power transmission when the installation of the power receiving device has been detected; and causing the power transmitting device to perform intermittent power transmission when the installation of the power receiving device has not been detected.

In the power transmission control method according to this embodiment, the power transmitting device performs intermittent power transmission. The power receiving device that has received intermittent power transmission transmits a response. The power transmitting device detects the response from the power receiving device to detect installation of the power receiving device at the power reception position. The power transmitting device starts continuous power transmission when installation of the power receiving device has been detected, and continuously performs intermittent power transmission without performing continuous power transmission when installation of the power receiving device has not been detected. According to this method, it suffices that the user merely set the power-receiving-side instrument (power receiving device) without operating a switch or the like. Therefore, convenience to the user is significantly improved. Since a small amount of power is consumed during intermittent power transmission, power consumption can be reduced.

As described above, at least one embodiment of the invention can provide non-contact power transmission technology that is highly convenient to the user and can reduce power consumption. At least one embodiment of the invention can provide highly reliable non-contact power transmission technology provided with appropriate safety measures. At least one embodiment of the invention can provide non-contact power transmission technology that reduces the size and cost of a non-contact power transmission system by reducing the number of parts.

Preferred embodiments of the invention are described below with reference to the drawings. Note that the following embodiments do not in any way limit the scope of the invention defined by the claims laid out herein. Note that all elements of the following embodiments should not necessarily be taken as essential requirements for the invention.

First Embodiment

Examples of an electronic instrument to which the invention is suitably applied and the principle of non-contact power transmission technology are described below.

Figure 1B:
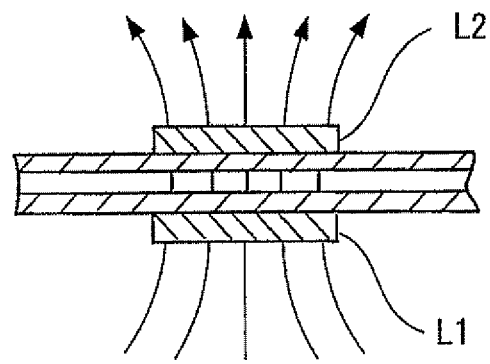

Examples of Electronic Instrument and Principle of Non-Contact Power Transmission FIGS. 1A and 1B are views illustrative of examples of an electronic instrument to which the non-contact power transmission technology is applied, and the principle of non-contact power transmission using an induction transformer.

As shown in FIG. 1A, a charger (cradle) 500 (i.e., power-transmitting-side electronic instrument) includes a power transmitting device (e.g., power transmitting module including a power-transmitting-side control circuit (power-transmitting-side control IC)) 10. The charger (cradle) 500 also includes a display section (e.g., LED) 16 that is turned ON during normal power transmission of the charger.

A portable telephone 510 (i.e., power-receiving-side instrument) includes a power receiving device (e.g., power receiving module including a power-receiving-side control circuit (power-receiving-side control IC)) 40. The portable telephone 510 also includes a display section 512 (e.g., LCD), an operation section 514 that includes a button or the like, a microphone 516 (sound input section), a speaker 518 (sound output section), and an antenna 520.

Power is supplied to the charger 500 through an AC adaptor 502. The power supplied to the charger 500 is transmitted from the power transmitting device 10 to the power receiving device 40 by means of non-contact power transmission. This makes it possible to charge a battery of the portable telephone 510 or operate a device provided in the portable telephone 510.

As schematically shown in FIG. 1B, power transmission from the power transmitting device 10 to the power receiving device 40 is implemented by electromagnetically coupling a primary coil L1 (power-transmitting-side coil) provided in the power transmitting device 10 and a secondary coil L2 (power-receiving-side coil) provided in the power receiving device 40 to form a power transmission transformer. This enables non-contact power transmission.

Note that the electronic instrument to which this embodiment is applied is not limited to the portable telephone 510. For example, this embodiment may be applied to various other electronic instruments such as a wristwatch, a cordless telephone, a shaver, an electric toothbrush, a wrist computer, a handy terminal, a portable information terminal, and a power-assisted bicycle.

Examples of particularly suitable electronic instruments include a portable terminal (including a portable telephone terminal, PDA terminal, and portable personal computer terminal) and a watch. Since the power receiving device according to the invention has a simple configuration and a reduced size, the power receiving device can be incorporated in a portable terminal or the like. The charging time of a secondary battery provided in an electronic instrument can be reduced using the power receiving device according to the invention due to low loss. Moreover, since the power receiving device according to the invention reduces heat generation, the reliability of an electronic instrument is improved from the viewpoint of safety.

In particular, since a large amount of charging current flows through a portable terminal (including a portable telephone terminal, PDA terminal, and portable personal computer terminal) under heavy load, heat may be generated to a large extent. Therefore, the features of the invention (i.e., low loss and low heat generation) can be sufficiently utilized for such a portable terminal.

The power transmitting device 10 provided in the charger (cradle) 500 shown in FIG. 1A performs intermittent temporary power transmission in a given cycle, and detects a response from the power receiving device 40 that has received power to automatically detect installation (setting) of the portable telephone 510 (i.e., power-receiving-side instrument) in an area in which power transmitted via non-contact power transmission can be received. When installation (setting) of the portable telephone 510 has been detected, normal power transmission (continuous normal power transmission) automatically starts. Therefore, it suffices that the user merely set the portable telephone 510 on the charger (cradle) 500 without operating a switch or the like. A non-contact power transmission system that is convenient to the user is implemented. Note that installation in an area in which power transmitted via non-contact power transmission can be received includes placing a portable terminal as the power-receiving-side instrument on the charger, for example. When the charger is a wall-type charger, installation in an area in which power transmitted via non-contact power transmission can be received includes placing a portable terminal as the power-receiving-side instrument against the charger.

After the power transmitting device 10 has received a full-charge notification from the power receiving device 40, the power transmitting device 10 can perform intermittent power transmission for detecting whether or not recharging is necessary or intermittent power transmission for removal detection after full-charging. This enables automatic recharge management after full-charging.

Configuration Examples of Power Transmitting Device and Power Receiving Device

Figure 2:
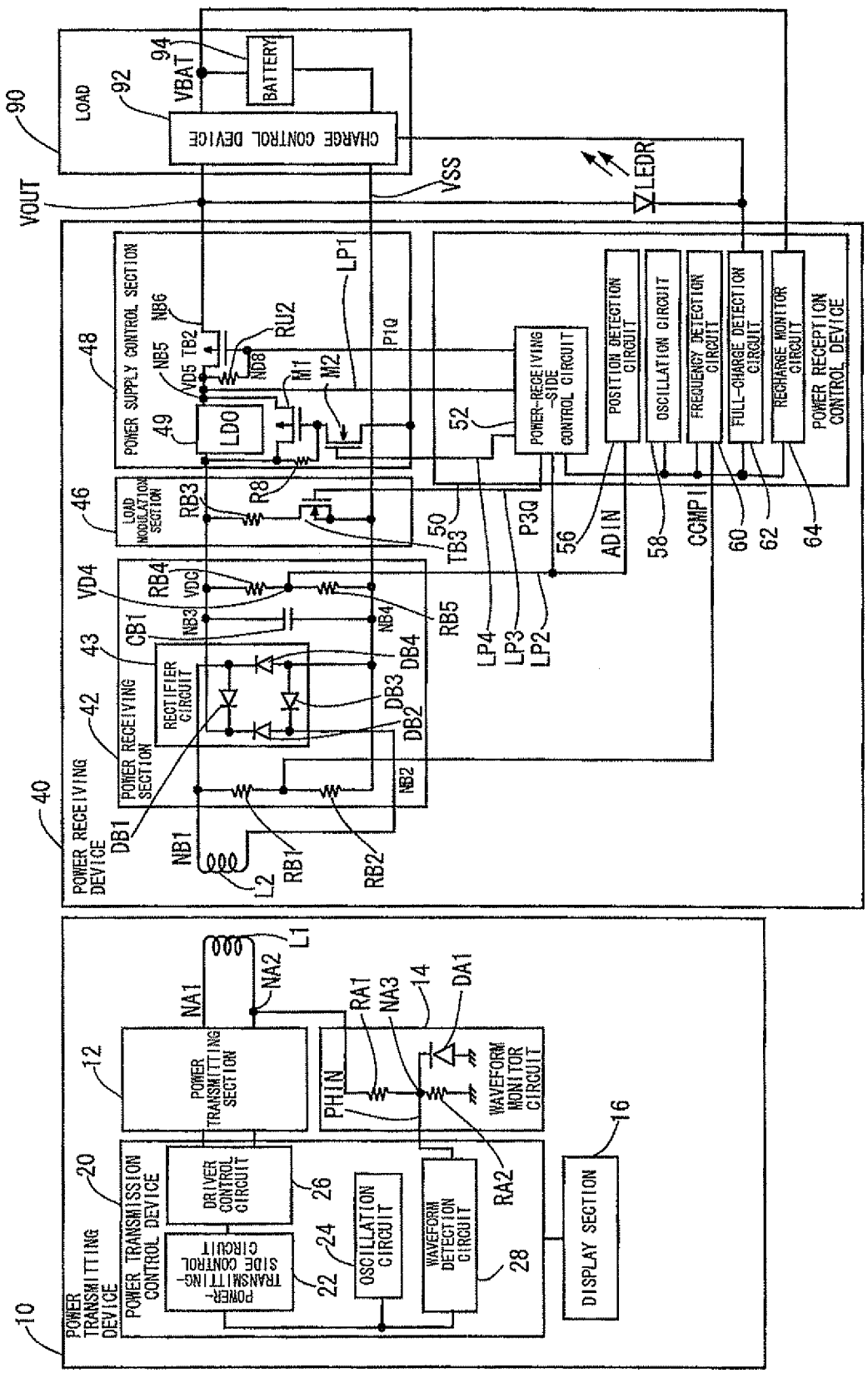
FIG. 2 is a circuit diagram showing an example of a specific configuration of each section of a non-contact power transmission system that includes a power transmitting device and a power receiving device.

FIG. 2 is a circuit diagram showing an example of a specific configuration of each section of a non-contact power transmission system that includes a power transmitting device and a power receiving device. As shown in FIG. 2, the power transmitting device 10 includes a power transmission control device 20, a power transmitting section 12, and a waveform monitor circuit 14. The power transmission control device 20 includes a power-transmitting-side control circuit 22, an oscillation circuit 24, a driver control circuit 26, and a waveform detection circuit 28.

The power receiving device 40 includes a power receiving section 42, a load modulation section 46, a power supply control section 48, and a power reception control device 50. A load 90 includes a charge control device 92 and a battery (secondary battery) 94. The details are given below. A power-transmitting-side electronic instrument such as the charger 500 includes at least the power transmitting device 10 shown in FIG. 2. A power-receiving-side electronic instrument such as the portable telephone 510 includes at least the power receiving device 40 and the load 90. The configuration shown in FIG. 2 implements a non-contact power transmission (contactless power transmission) system that transmits power from the power transmitting device 10 to the power receiving device 40 by electromagnetically coupling the primary coil L1 and the secondary coil L2 to supply power (voltage VOUT) to the load 90 from a voltage output node NB6 of the power receiving device 40.

The power transmitting device 10 (power transmitting module or primary module) may include the primary coil L1, the power transmitting section 12, the waveform monitor circuit 14, the display section 16, and the power transmission control device 20. The power transmitting device 10 and the power transmission control device 20 are not limited to the configuration shown in FIG. 2. Various modifications may be made such as omitting some (e.g., display section and waveform monitor circuit) of the elements, adding other elements, or changing the connection relationship. The power transmitting section 12 generates an alternating-current voltage having a given frequency during power transmission, and generates an alternating-current voltage having a frequency that differs depending on data during data transfer. The power transmitting section 12 supplies the alternating-current voltage to the primary coil L1.

Figure 3A:
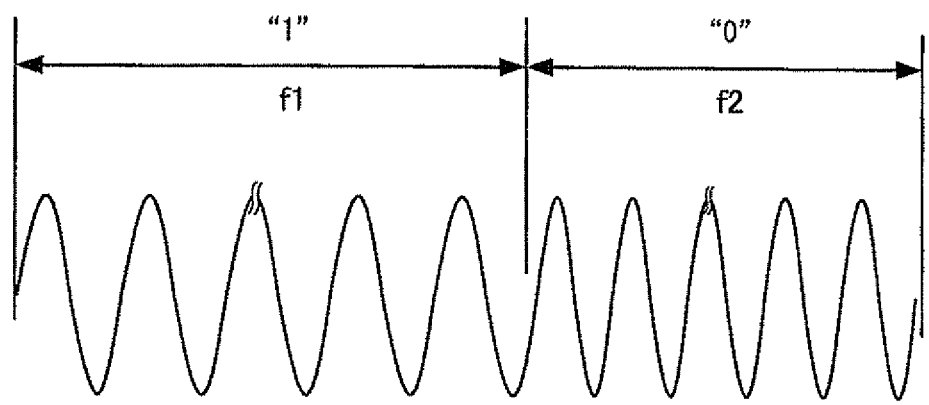
FIGS. 3A and 3B are views illustrative of the principle of information transmission between a power-transmitting-side instrument and a power-receiving-side instrument.
Figure 3B:
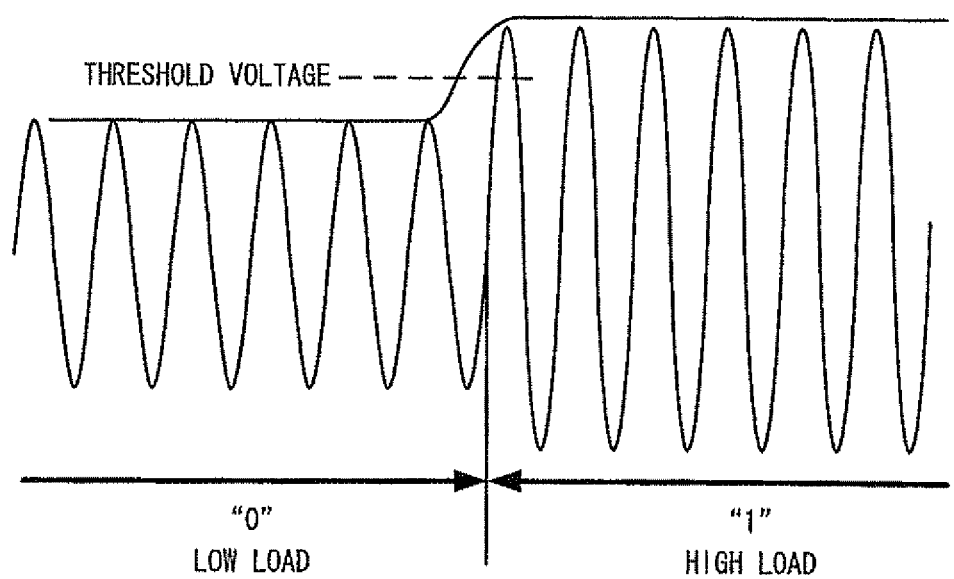

FIGS. 3A and 3B are views illustrative of an example of the principle of information transmission between the power-transmitting-side instrument and the power-receiving-side instrument. Information is transmitted from the primary-side instrument to the secondary-side instrument utilizing frequency modulation. Information is transmitted from the secondary-side instrument to the primary-side instrument utilizing load modulation. As shown in FIG. 3A, the power transmitting device 10 generates an alternating-current voltage having a frequency f1 when transmitting data "1" to the power receiving device 40, and generates an alternating-current voltage having a frequency f2 when transmitting data "0" to the power receiving device 40, for example. As shown in FIG. 3B, the power receiving device 40 can switch the load state between a low-load state and a high-load state by load modulation to transmit data "0" or "1" to the primary-side instrument (power transmitting device 10).

Again referring to FIG. 2, the power transmitting section 12 may include a first power transmitting driver that drives one end of the primary coil L1, a second power transmitting driver that drives the other end of the primary coil L1, and at least one capacitor that forms a resonant circuit with the primary coil L1. Each of the first and second power transmitting drivers included in the power transmitting section 12 is an inverter circuit (or buffer circuit) that includes a power MOS transistor, for example, and is controlled by the driver control circuit 26 of the power transmission control device 20.

The primary coil L1 (power-transmitting-side coil) is electromagnetically coupled to the secondary coil L2 (power-receiving-side coil) to form a power transmission transformer. For example, when power transmission is necessary, the portable telephone 510 is placed on the charger 500 so that a magnetic flux of the primary coil L1 passes through the secondary coil L2, as shown in FIG. 1. When power transmission is unnecessary, the charger 500 and the portable telephone 510 are physically separated so that a magnetic flux of the primary coil L1 does not pass through the secondary coil L2.

The waveform monitor circuit 14 is a circuit that detects an induced voltage in the primary coil L1. The waveform monitor circuit 14 includes resistors RA1 and RA2, and a diode DA1 provided between a connection node NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to the waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 controls the power transmitting device 10. The power transmission control device 20 may be implemented by an integrated circuit device (IC) or the like. The power transmission control device 20 includes the power-transmitting-side control circuit 22, the oscillation circuit 24, the driver control circuit 26, and the waveform detection circuit 28.

The power-transmitting-side control circuit 22 controls the power transmitting device 10 and the power transmission control device 20. The power-transmitting-side control circuit 22 may be implemented by a gate array, a microcomputer, or the like.

Specifically, the power-transmitting-side control circuit 22 performs sequence control and a determination process necessary for power transmission, load detection, frequency modulation, foreign object detection, removal (detachment) detection, and the like. The power-transmitting-side control circuit 22 starts temporary power transmission for position detection and ID authentication targeted at the power receiving device 40 when the switch (SW) has been turned ON (described later).

The oscillation circuit 24 is formed by a crystal oscillation circuit or the like, and generates a primary-side clock signal. The driver control circuit 26 generates a control signal at a desired frequency based on the clock signal generated by the oscillation circuit 24, a frequency setting signal output from the control circuit 22, and the like, and outputs the generated control signal to the power transmitting drivers (not shown) of the power transmitting section 12 to control the operations of the power transmitting drivers.

The waveform detection circuit 28 monitors the waveform of the signal PHIN that corresponds to an induced voltage at one end of the primary coil L1, and performs load detection, foreign object detection, and the like. For example, when the load modulation section 46 of the power receiving device 40 has performed load modulation for transmitting data to the power transmitting device 10, the signal waveform of the induced voltage in the primary coil L1 changes correspondingly.

As shown in FIG. 3B, the amplitude (peak voltage) of the signal waveform decreases when the load modulation section 46 of the power receiving device 40 reduces the load in order to transmit data "0", and increases when the load modulation section 46 increases the load in order to transmit data "1", for example. Therefore, the waveform detection circuit 28 can determine whether the data transmitted from the power receiving device 40 is "0" or "1" by determining whether or not the peak voltage has exceeded a threshold voltage by performing a peak-hold process on the signal waveform of the induced voltage, for example. Note that the waveform detection method is not limited to the above-described method. For example the waveform detection circuit 28 may determine whether the power-receiving-side load has increased or decreased utilizing a physical quantity other than the peak voltage.

The power receiving device 40 (power receiving module or secondary module) may include the secondary coil L2, the power receiving section 42, the load modulation section 46, the power supply control section 48, and a power reception control device 50. Note that the power receiving device 40 and the power reception control device 50 are not limited to the configuration shown in FIG. 2. Various modifications may be made such as omitting some of the elements, adding other elements, or changing the connection relationship.

The power receiving section 42 converts an alternating-current induced voltage in the secondary coil L2 into a direct-current voltage. A rectifier circuit 43 included in the power receiving section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power receiving section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power receiving section 42 are provided between the node NB3 (direct-current voltage VDC) and the node NB4 (VSS). A divided voltage VD4 obtained by dividing the voltage between the nodes NB3 and NB4 using the resistors RB4 and RB5 is input to a power-receiving-side control circuit 52 and a position detection circuit 56 through a signal line LP2. The divided voltage VD4 is input to the position detection circuit 56 as a position detection signal input (ADIN).

The load modulation section 46 performs a load modulation process. Specifically, when the power receiving device 40 transmits the desired data to the power transmitting device 10, the load modulation section 46 variably changes the load of the load modulation section 46 (secondary side) corresponding to the transmission target data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-controlled based on a control signal P3Q supplied from the power-receiving-side control circuit 52 of the power reception control device 50 through a signal line LP3. When performing the load modulation process by ON/OFF-controlling the transistor TB3 and transmitting a signal to the power transmitting device in an authentication stage before normal power transmission starts, a transistor TB2 of the power supply control section 48 is turned OFF so that the load 90 is not electrically connected to the power receiving device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 is equivalent to the resistor RB3 (high load).

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A switch circuit formed using a PMOS transistor (M1) is provided between the input terminal and the output terminal of the regulator (LDO) 49. A path that bypasses the regulator (LDO) 49 is formed by causing the PMOS transistor (M1) (switch circuit) to be turned ON. For example, since a power loss increases due to the equivalent impedance of the regulator 49 and heat generation increases under heavy load (e.g., when it is necessary to cause an almost constant large current to steadily flow in the initial stage of charging a secondary battery exhausted to a large extent), a current is supplied to the load through a path that bypasses the regulator.

An NMOS transistor (M2) and a pull-up resistor R8 that function as a bypass control circuit are provided to ON/OFF-control the PMOS transistor (M1) (switch circuit).

The NMOS transistor (M2) is turned ON when a high-level control signal is supplied to the gate of the NMOS transistor (M2) through a signal line LP4. This causes the gate of the PMOS transistor (M1) to be set at a low level so that the PMOS transistor (M1) is turned ON. As a result, a path that bypasses the regulator (LDO) 49 is formed. When the NMOS transistor (M2) is turned OFF, the gate of the PMOS transistor (M1) is maintained at a high level through the pull-up resistor R8. Therefore, the PMOS transistor (M1) is turned OFF so that the bypass path is not formed.

The NMOS transistor (M2) is ON/OFF-controlled by the power-receiving-side control circuit 52 included in the power reception control device 50.

The transistor TB2 (P-type CMOS transistor) is provided between a power supply voltage (VD5) generation node NB5 (output node of the regulator 49) and the node NB6 (voltage output node of the power receiving device 40), and is controlled based on a signal P1Q output from the power-receiving-side control circuit 52 of the power reception control device 50. Specifically, the transistor TB2 is turned ON when normal power transmission is performed after completion (establishment) of ID authentication.

A pull-up resistor RU2 is provided between the power supply voltage generation node NB5 and a node NB8 of the gate of the transistor TB2.

The power reception control device 50 controls the power receiving device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-receiving-side) control circuit 52, the position detection circuit 56, an oscillation circuit 58, the frequency detection circuit 60, a full-charge detection circuit 62, and a recharge monitor circuit 64.

The power-receiving-side control circuit 52 controls the power receiving device 40 and the power reception control device 50. The power-receiving-side control circuit 52 may be implemented by a gate array, a microcomputer, or the like. The power-receiving-side control circuit 52 operates based on a constant voltage (VD5) at the output terminal of the series regulator (LDO) 49 as a power supply voltage. The power supply voltage (VD5) is supplied to the power-receiving-side control circuit 52 through a power supply line LP1.

The power-receiving-side control circuit 52 performs sequence control and a determination process necessary for ID authentication, position detection, frequency detection, full-charge detection, recharge determination, load modulation for authentication communication, load modulation for communication that enables detection of foreign object insertion, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is appropriate.

Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmitting device 10 is "1" or "0".

The full-charge detection circuit 62 (charge detection circuit) detects whether or not the battery 94 of the load 90 has been fully charged (charge state). Specifically, the full-charge detection circuit 62 detects the full-charge state by detecting whether a light-emitting device (LEDR) used to indicate the charge state is turned ON or OFF, for example. The full-charge detection circuit 62 determines that the battery 94 has been fully charged (charging has been completed) when the light-emitting device (LEDR) has been turned OFF for a given period of time (e.g., five seconds).

The load 90 includes the charge control device 92 that controls charging of the battery 94 and the like. The charge control device 92 detects a full-charge state based on the ON/OFF state of the light-emitting device (LEDR). The charge control device 92 (charge control IC) may be implemented by an integrated circuit device or the like. The battery 94 may be provided with the function of the charge control device 92. Note that the load 90 is not limited to a secondary battery. For example, a given circuit may serve as a load when the circuit operates.

When the power-receiving-side instrument 510 is allowed to stand on the cradle 500 for a long time after full-charging, a battery voltage VBAT decreases due to discharge. The recharge monitor circuit 64 determines whether or not recharging is necessary based on the battery voltage VBAT. For example, the recharge monitor circuit 64 determines that recharging is necessary when the battery voltage VBAT has become lower than a threshold voltage.

Outline of Operation of Power Transmitting Device

Figure 4:
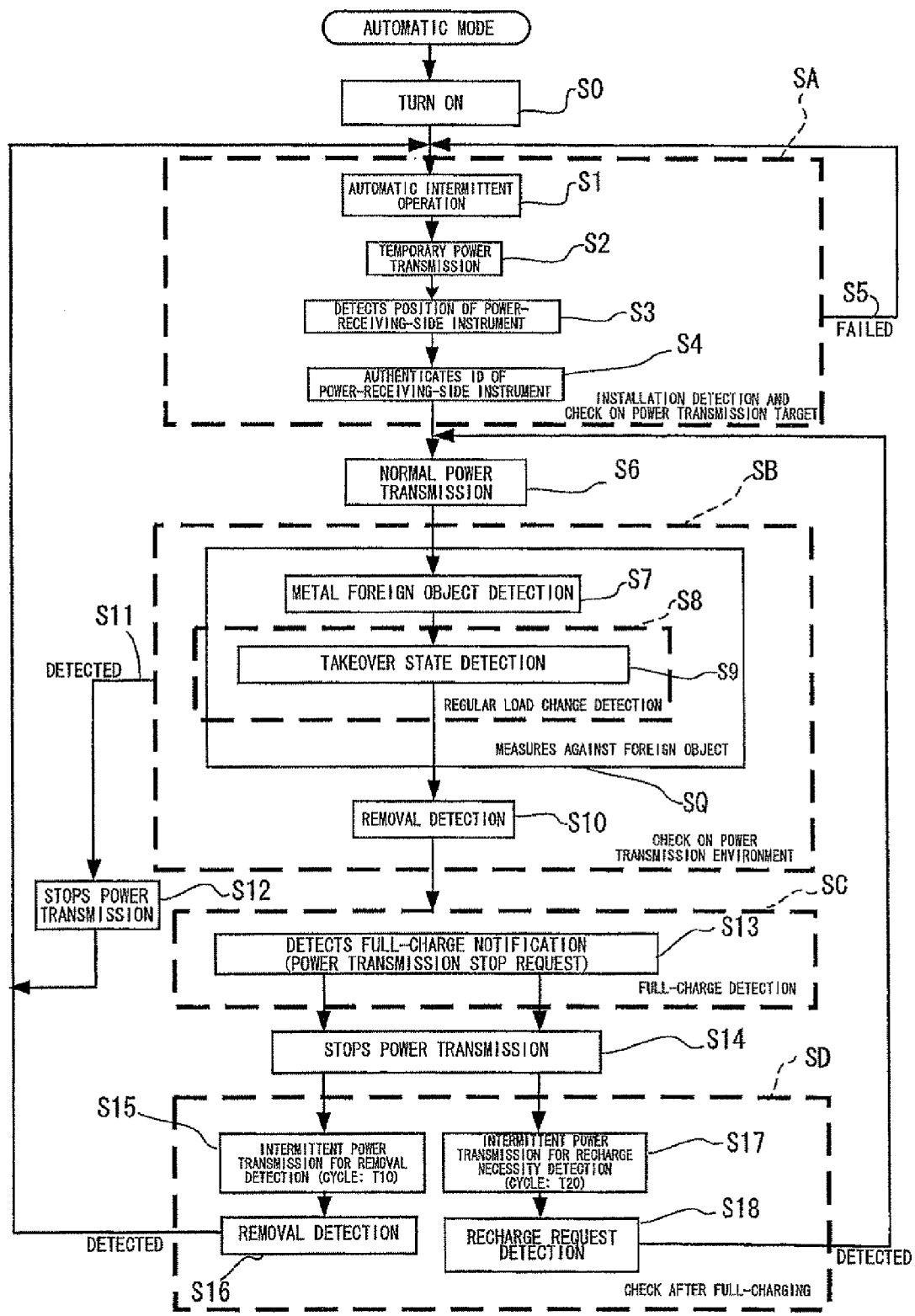
FIG. 4 is a flowchart showing an outline of an example of the operation of a power transmitting device.

FIG. 4 is a flowchart showing an outline of an example of the operation of the power transmitting device. The power-transmitting-side control circuit 22 of the power transmitting device 1O according to the invention automatically detects installation of the power-receiving-side instrument 510, and manages recharging after full-charging, as described above. An operation mode in which the power transmitting device 10 automatically performs a series of operations is referred to as "automatic mode".

The operation of the power transmitting device 10 in the automatic mode is roughly divided into installation detection and a check on the power transmission target (step SA), a check on the power transmission environment during normal power transmission (step SB), full-charge detection (step SC), and monitoring after full-charging (step SD) (these steps are enclosed by bold dotted lines in FIG. 4). These steps are described below.

When the power transmitting device 10 has been turned ON (step S0), the power transmitting device 10 performs installation detection and a check on the power transmission target (step SA). The step SA includes steps S1 to S4. In the steps S1 and S2, the power transmitting device 10 performs intermittent temporary power transmission by automatically and intermittently driving the primary coil L1 in a given cycle (e.g., 0.3 seconds). The power transmitting device 10 then checks whether or not the power-receiving-side instrument 510 is placed at an appropriate position (step S3), and performs ID authentication on the power-receiving-side instrument 510 (or the power receiving device 40) to determine whether or not the power-receiving-side instrument 510 is an appropriate power transmission target (step S4).

When the position of the power receiving device 40 has been detected successfully (step S3), the power receiving device 40 transmits ID authentication information to the power transmitting device 10 within a given period of time. The power transmitting device 10 detects installation of the power-receiving-side instrument 510 by checking whether or not the ID authentication information is transmitted from the power receiving device within a given period of time after the intermittent temporary power transmission timing. When the power transmitting device 10 cannot detect installation of the power-receiving-side instrument 510 or has failed in ID authentication (step S4) (step S5), the power transmitting device 10 stops temporary power transmission, and intermittently performs temporary power transmission (initial state).

Figure 12:
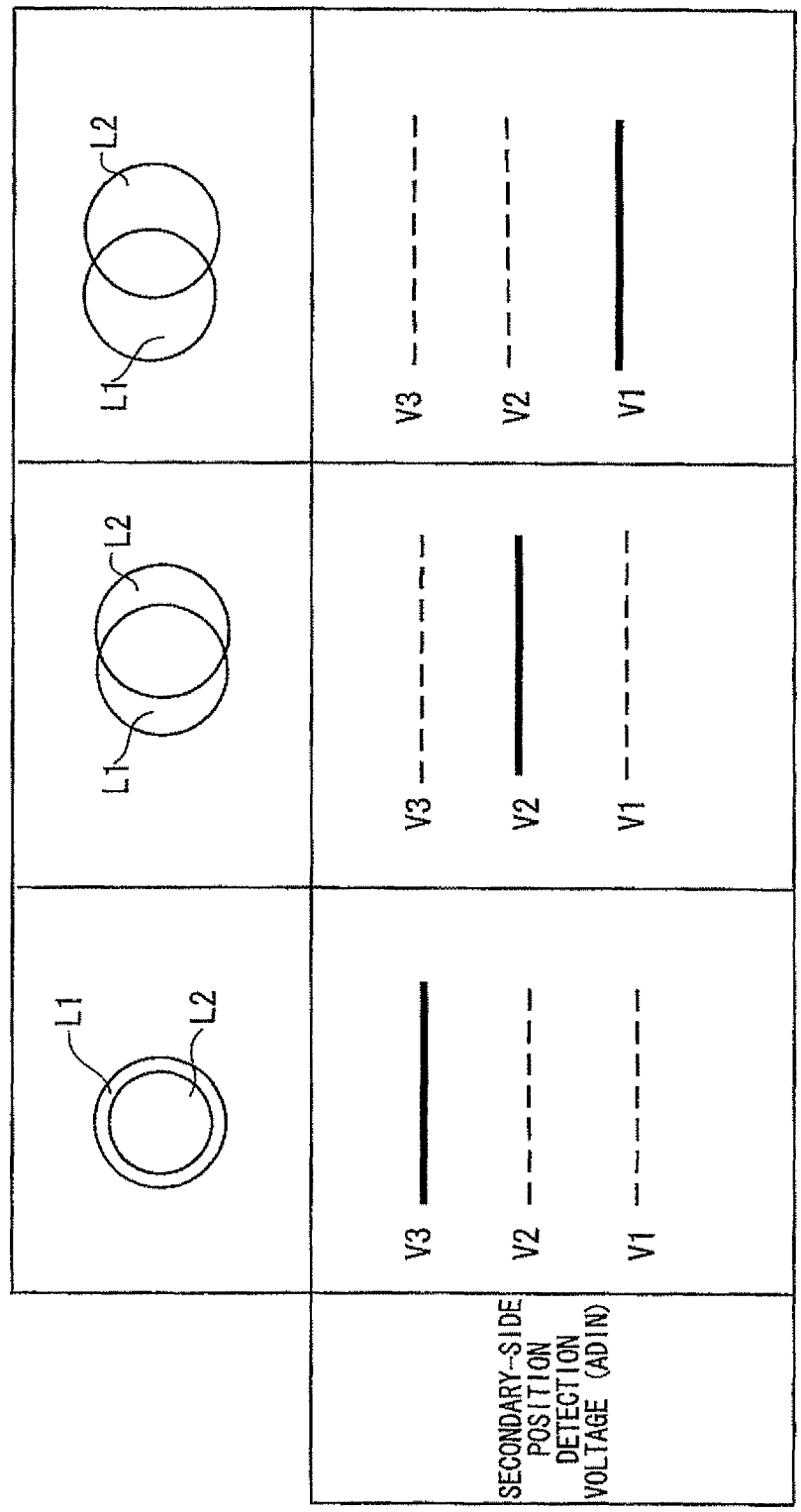
FIG. 12 is a view illustrative of the position detection principle.

The position detection circuit 56 included in the power receiving device 40 shown in FIG. 2 checks whether or not the power-receiving-side instrument 510 is placed at an appropriate position (position detection) (step S3) based on a direct-current voltage (ADIN) obtained by rectifying the induced voltage in the secondary coil (L2), for example. FIG. 12 is a view illustrative of the position detection principle. As shown in FIG. 12, the voltage level of the direct-current voltage ADIN changes corresponding to the positional relationship between the primary coil (L1) and the secondary coil (L2).

For example, a direct-current voltage (ADIN) at a given level (level V3) cannot be obtained when the power-receiving-side instrument is placed at an inappropriate position (i.e., the power-receiving-side instrument is determined to be placed at an inappropriate position). The position detection result may be transmitted from the power receiving device 40 to the power transmitting device 10 utilizing load modulation, for example. The power receiving device 40 may notify the power transmitting device 10 that the power-receiving-side instrument is placed at an inappropriate position by not transmitting the ID authentication information to the power transmitting device 10 within a given period of time after receiving temporary power transmission.

Again referring to FIG. 4, when the power transmitting device 10 has succeeded in ID authentication (step S4), the power transmitting device 10 starts normal power transmission (step S6). The power transmitting device 10 performs metal foreign object detection (step S7) and takeover state detection by means of regular load change detection (steps S8 and S9) during normal power transmission. The power transmitting device 10 also detects removal (leave) of the power-receiving-side instrument 510 (step S10). When the power transmitting device 10 has detected a metal foreign object, a takeover state, or removal of the power-receiving-side instrument 510 (step S11), the power transmitting device 1O stops normal power transmission, and returns to the step S1 (automatic intermittent operation).

A metal foreign object (step S7) and a takeover state (step S10) may be detected based on a change in the waveform of an induced voltage signal of the primary coil (L1). The details are described below.

FIGS. 13A to 13F are views illustrative of the principle of metal foreign object (conductive foreign object) detection. FIGS. 13B to 13F show changes in an induced voltage signal (V(NA2)) of the primary coil L1 shown in FIG. 13A corresponding to the relative positions of the primary coil and a metal foreign object (conductive foreign object) MET. As shown in FIGS. 13B to 13F, the waveform (amplitude) of the induced voltage signal V(NA2) when the metal foreign object MET is absent (FIG. 13F) differs from the waveform (amplitude) of the induced voltage signal V(NA2) when the metal foreign object (MET) is present (FIGS. 13B to 13E). Therefore, the presence or absence of the metal foreign object (MET) can be detected by monitoring the waveform of the induced voltage signal V(NA2) of the primary coil (L1) using the waveform monitor circuit 14 (see FIG. 2). The term "waveform monitoring" includes monitoring the amplitude, monitoring the phases of a current and a voltage, and the like.

Figure 14A:
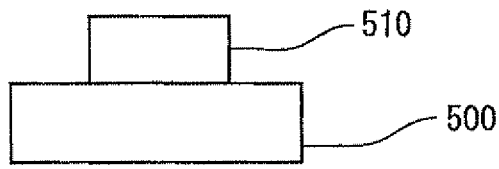
FIGS. 14A to 14D are views illustrative of the removal (leave) detection principle.
Figure 14B:
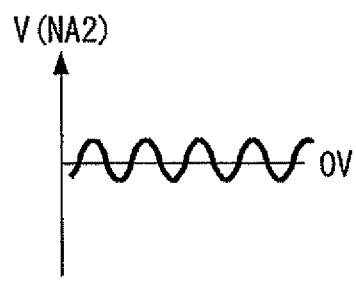
Figure 14C:
Figure 14D:
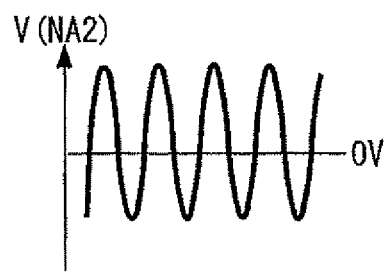

FIGS. 14A to 14D are views illustrative of the principle of removal detection. When the power-receiving-side instrument 510 is placed as shown in FIG. 14A, the induced voltage signal V(NA2) of the primary coil (L1) has a waveform shown in FIG. 14B. When the power-receiving-side instrument 510 has been removed as shown in FIG. 14C, the induced voltage signal V(NA2) of the primary coil (L1) has a waveform shown in FIG. 14D. The waveform (amplitude) shown in FIG. 14D clearly differs from the waveform shown in FIG. 14B. Therefore, whether or not the power-receiving-side instrument has been removed can be detected by monitoring the waveform of the induced voltage signal V(NA2) of the primary coil (L1) using the waveform monitor circuit 14 (see FIG. 2).

Whether or not a takeover state has occurred may be detected (step S9 in FIG. 4) by determining whether or not the power-transmitting-side instrument can detect an intermittent (e.g., regular) load modulation signal from the power-receiving-side instrument (described later).

Again referring to FIG. 4, when the power-transmitting-side control circuit 22 of the power transmitting device 10 has detected the full-charge notification (that indicates that the battery has been fully charged) transmitted from the receiving device 40 (step S13), the power-transmitting-side control circuit 22 stops normal power transmission (step S14), and optionally transitions to the monitoring step after full-charging (step SD).

The full-charge detection circuit 62 included in the power receiving device 40 shown in FIG. 2 detects whether or not the battery 94 has been fully charged. When the full-charge detection circuit 62 has detected that the battery 94 has been fully charged, the power-receiving-side control circuit 52 included in the power receiving device 40 transmits the full-charge notification to the power transmitting device 10. When the power-transmitting-side control circuit 22 of the power transmitting device 10 has detected the full-charge notification transmitted from the power receiving device 40, the power-transmitting-side control circuit 22 performs the monitoring step after full-charging (step SD).

The monitoring step after full-charging (step SD) includes an intermittent power transmission step in a cycle T10 (step S15), a removal detection step (step S16) (steps S15 and S16 are used to detect removal after full-charging), an intermittent power transmission step in a cycle T20 (step S17), and a recharge request detection step (step S18) (steps S17 and S18 are used to detect whether or not recharging is necessary). Therefore, the power-transmitting-side control circuit 22 can monitor the load state after the load (battery) 94 of the power-receiving-side instrument 510 has been fully charged to automatically resume recharging.

Specifically, when the power-receiving-side instrument 510 remains on the cradle 500 after full-charging, the load (battery) 94 is discharged with the passage of time so that recharging may be required. Therefore, the power-transmitting-side control circuit 22 performs intermittent power transmission in an appropriate cycle after a full-charge state has been detected instead of normal power transmission to automatically determine whether or not the load must be recharged, and resumes normal power transmission (step S6) when recharging is necessary. Therefore, the load (battery) 94 is automatically recharged. Accordingly, even if the power-receiving-side instrument 510 is allowed to stand for a long time after full-charging, the load (battery) 94 has been necessarily fully charged when the user uses the power-receiving-side instrument 510. This prevents a situation in which the battery becomes charged insufficiently due to discharge. Therefore, convenience to the user can be improved.

Note that it is unnecessary to manage recharging when the power-receiving-side instrument has been removed after full-charging. Therefore, the power-transmitting-side control circuit 22 performs intermittent power transmission for removal detection after full-charging in addition to intermittent power transmission for recharge management (step S15). It may be determined that the power-receiving-side instrument 510 has been removed when no response is transmitted from the power-receiving-side instrument 510 after intermittent power transmission for removal detection has been performed. When the power-transmitting-side control circuit 22 included in the power transmitting device 10 has detected removal of the power-receiving-side instrument 510, the power-transmitting-side control circuit 22 returns to the initial state (i.e., a state in which intermittent temporary power transmission is performed). It is unnecessary to frequently perform intermittent power transmission for removal detection and intermittent power transmission for recharge management. It is desirable to perform intermittent power transmission for removal detection and intermittent power transmission for recharge management in an appropriate cycle in order to prevent an unnecessary increase in power consumption. Therefore, intermittent power transmission for removal detection is performed in the first cycle T10, and intermittent power transmission for recharge management is performed in the second cycle T20.

The first cycle T10 and the second cycle T20 are provided because it is desirable to optimize the cycle corresponding to the objective. Note that the first cycle T10 and the second cycle T20 may be the same. The term "full charge" used herein may be broadly interpreted as "a state in which the load of the power receiving device 40 is in a given state", for example. Therefore, the term "load" is not limited to a battery. For example, a given circuit of the power-receiving-side instrument 510 may serve as a load. For example, a state in which a given circuit that has operated by receiving power from the power transmitting device need not operate corresponds to a state in which the load has been fully charged. Such a case is also included in the technical scope of the aspect of the invention.

It is desirable that the cycle of intermittent temporary power transmission (i.e., the cycle of the automatic intermittent operation in the step S1 shown in FIG. 4) be very short (e.g., 0.3 seconds) in order to quickly detect installation of the power-receiving-side instrument 510. On the other hand, the cycle of removal detection after full-charging may be longer than the cycle of temporary power transmission. Specifically, unnecessary power consumption increases if removal detection is frequently performed. Therefore, the first cycle T10 of removal detection after full-charging is set at a value (e.g., 5 seconds) longer than the cycle of temporary power transmission to suppress an increase in power consumption. Whether or not recharging after full-charging is necessary may be detected at a lower frequency as compared with removal detection after full-charging (i.e., it takes time until the battery that has been fully charged is discharged so that recharging becomes necessary, and no practical problem occurs even if determination as to whether or not recharging is necessary is delayed to some extent). Therefore, the second cycle T20 of full-charge detection is set at a value (e.g., 10 minutes) longer than the first cycle T10. This enables intermittent power transmission to be performed in a cycle corresponding to the objective so that power consumption can be minimized.

Example of Configuration of Power-Transmitting-Side Control Circuit

Figure 5:
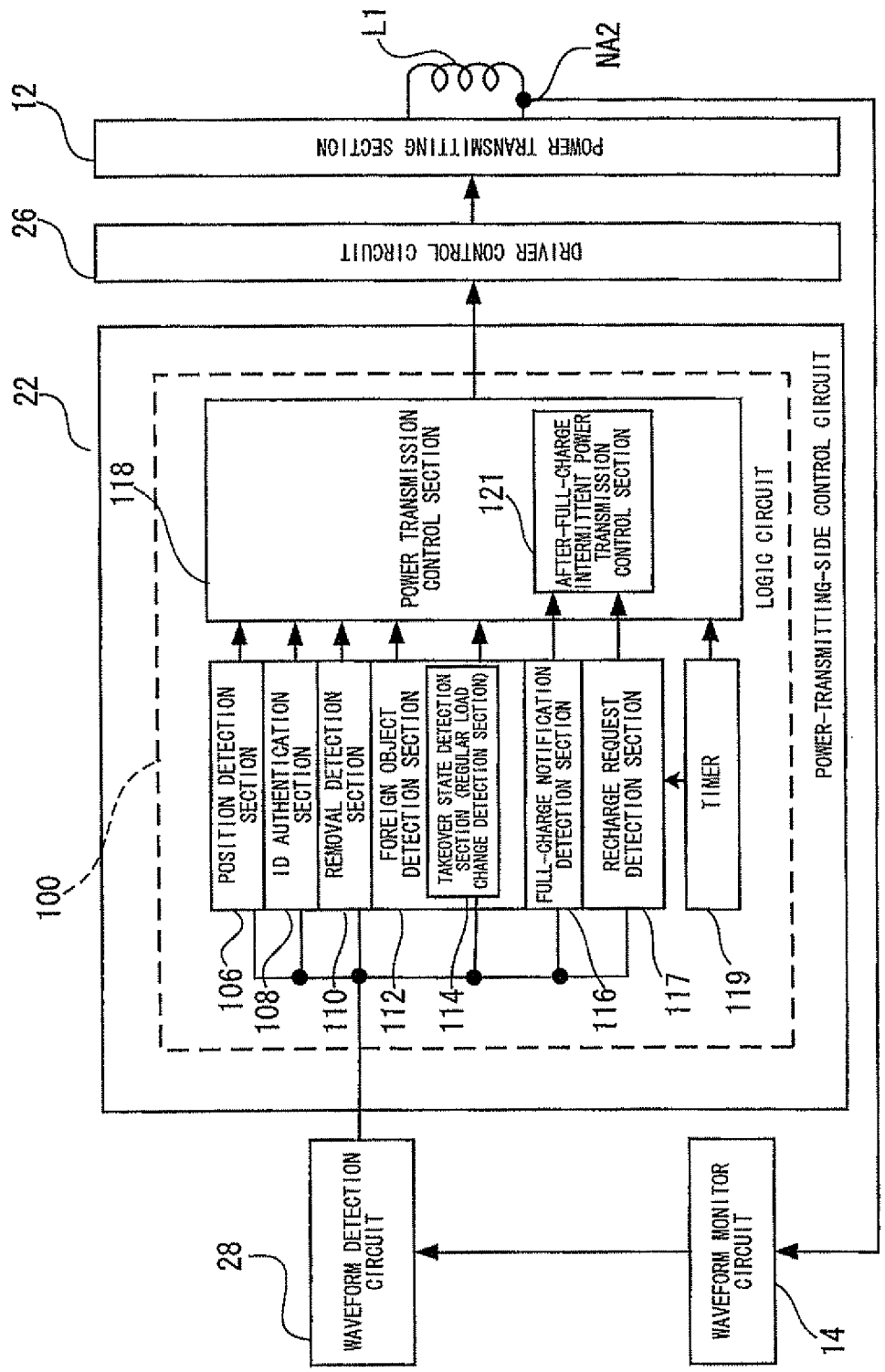
FIG. 5 is a circuit diagram showing an example of the configuration of a power-transmitting-side control circuit.

FIG. 5 is a circuit diagram showing an example of the configuration of the power-transmitting-side control circuit. As shown in FIG. 5, the power-transmitting-side control circuit 22 includes a logic circuit 100. The logic circuit 100 includes a position detection section 106, an ID authentication section 108, a removal detection section 110, a foreign object detection section 112 (including a takeover state detection section 114), a full-charge notification (power transmission stop request) detection section 116, a recharge request detection section 117, a time-management timer 119, and a power transmission control section 118 that ON/OFF-controls power transmission (temporary power transmission and normal power transmission) based on the detection result of each section. The power transmission control section 118 includes an after-full-charge intermittent power transmission control section 121.

Figure 6:
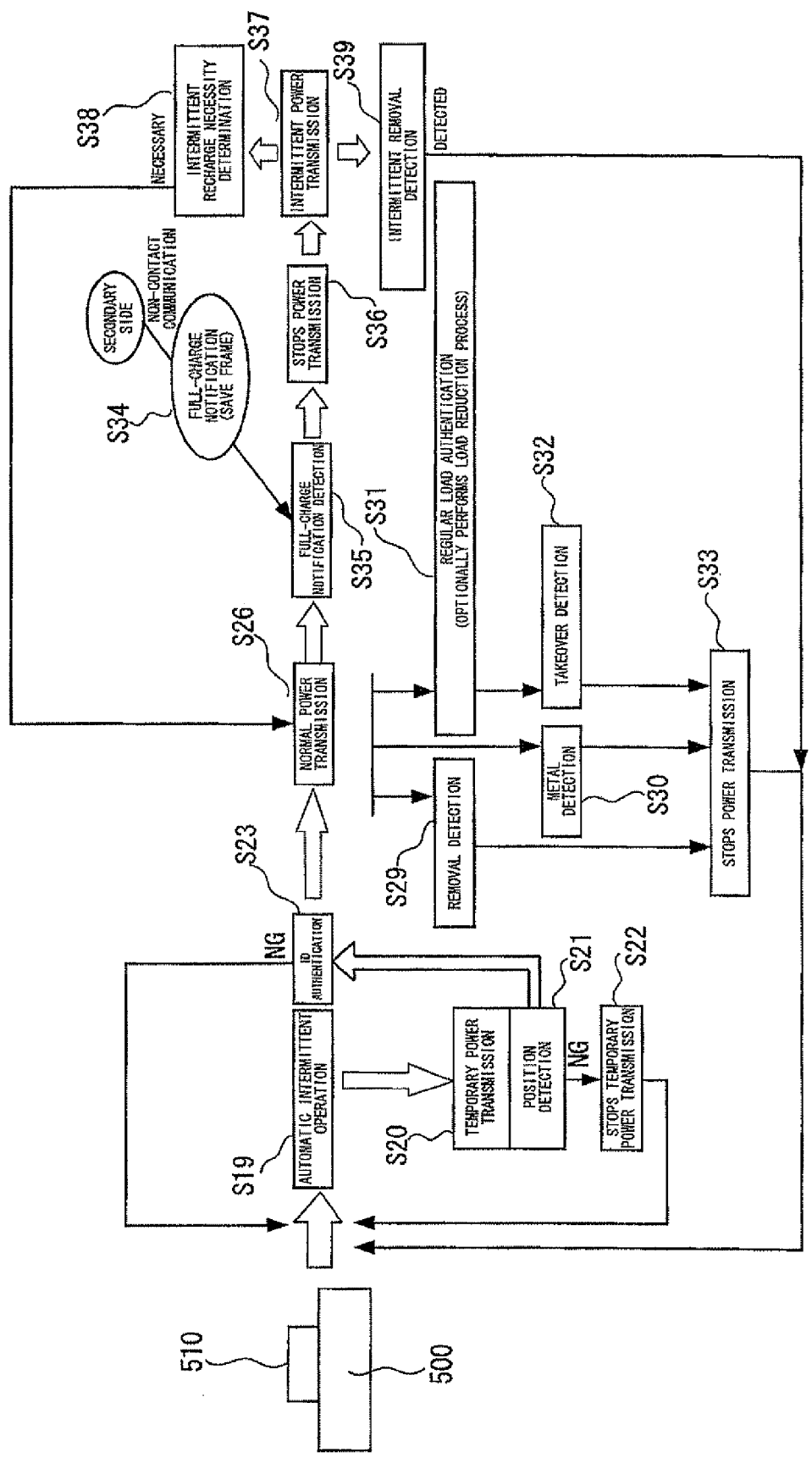
FIG. 6 is a view showing a basic sequence example of a non-contact power transmission system.

Basic Sequence Example of Non-Contact Power Transmission System in Automatic Mode FIG. 6 is a view showing a basic sequence example of the non-contact power transmission system in the automatic mode. The user places the power-receiving-side instrument 510 at a predetermined position of the charger 500, for example. The power transmitting device 10 performs the automatic intermittent operation to always perform intermittent temporary power transmission (steps S19 and S20). The position of the power-receiving-side instrument 510 that has received temporary power transmission is detected (step S21). When the position of the power-receiving-side instrument 510 is inappropriate, the power transmitting device 10 stops temporary power transmission (step S22).

When the power-receiving-side instrument 510 is placed at an appropriate position, the power transmitting device 10 performs ID authentication (step S23). Specifically, the power receiving device 40 transmits the ID authentication information (e.g., manufacturer information, instrument ID number, and rating information) to the power transmitting device 10.

When ID authentication has been completed successfully, the power transmitting device 10 starts normal power transmission for the power receiving device 40 (step S26). The power transmitting device 10 performs removal detection (step S29), metal foreign object detection (step S30), secondary-side regular load authentication (including an optional secondary-side load reduction process: step S31), and takeover state detection (step S32) during normal power transmission, and stops normal power transmission when one of these states has been detected (step S33). The term "load reduction" accompanying secondary-side regular load authentication refers to a process that reduces (or stops) power supplied to the load when performing load modulation to apparently reduce the load state, since the primary-side instrument may not successfully receive a modulation signal when load modulation is performed in a state in which the load state is heavy (described later with reference to FIG. 19).

In FIG. 6, when the power receiving device 40 has detected a full-charge state, the power receiving device 40 creates the full-charge notification (save frame; power transmission stop request frame), and transmits the full-charge notification to the power transmitting device 10 (step S34). When the power transmitting device 10 has detected the full-charge notification (power transmission stop request frame) (step S35), the power transmitting device 10 stops normal power transmission, and performs intermittent power transmission after full-charging (step S37). The power transmitting device 10 intermittently determines whether or not recharging is necessary (step S38). When the power transmitting device 10 has determined that recharging is necessary, the power transmitting device 10 resumes normal power transmission (step S26). The power transmitting device 10 detects whether or not the power-receiving-side instrument 510 has been removed after full-charging (step S39). When the power transmitting device 10 has detected that the power-receiving-side instrument 510 has been removed, the power transmitting device 10 returns to the initial state.

Figure 7:
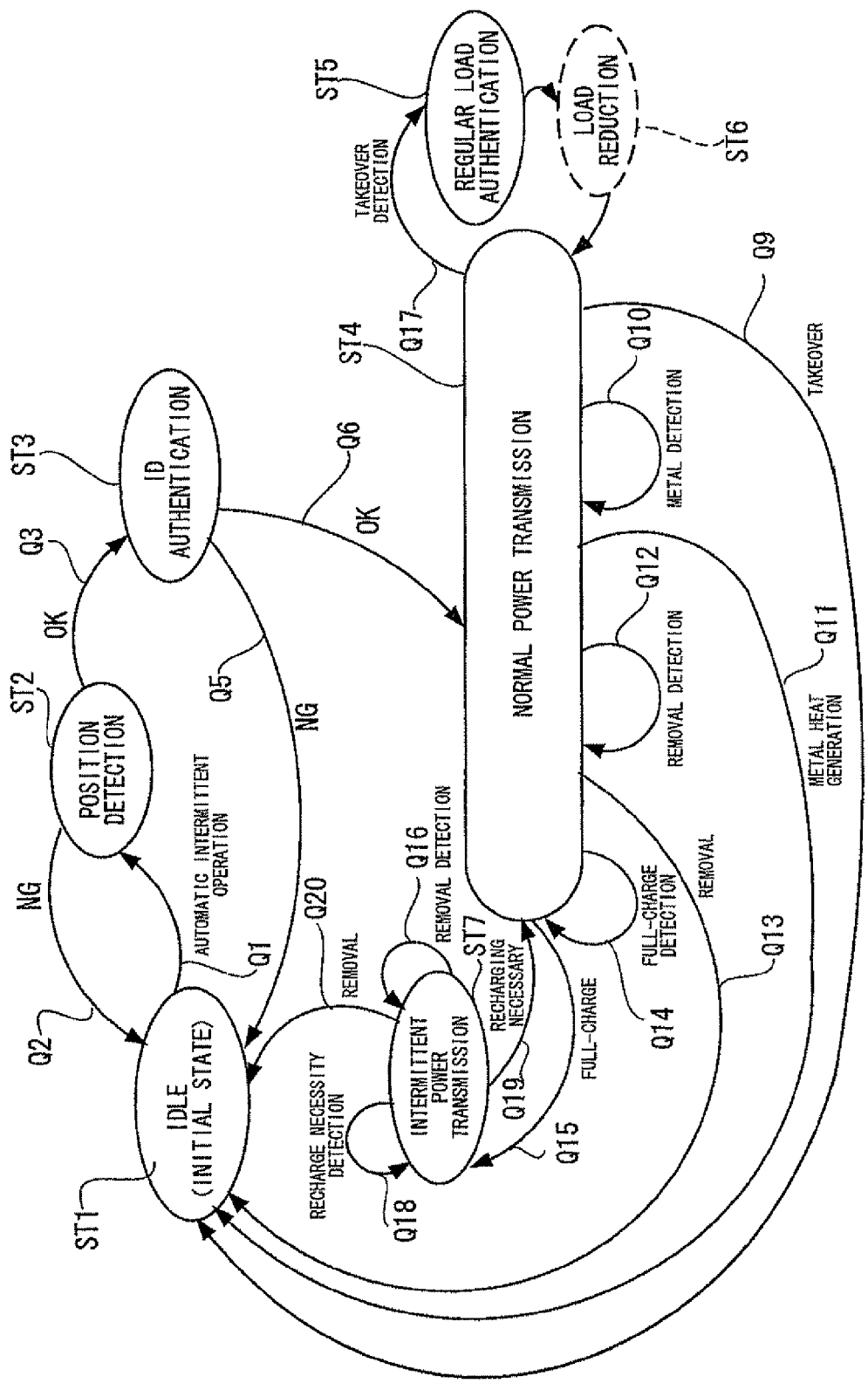
FIG. 7 is a state transition diagram showing the state transition of a non-contact power transmission system that performs the basic sequence shown in FIG. 6.

FIG. 7 is a state transition diagram showing the state transition of the non-contact power transmission system that performs the sequence shown in FIG. 6. As shown in FIG. 7, the state of the non-contact power transmission system is roughly divided into an initial state (idle state: ST1), a position detection state (ST2), an ID authentication state (ST3), a power transmission (normal power transmission) state (ST4), a regular load authentication state (ST5) (and a load reduction state (ST6)), and an intermittent power transmission state after full-charging (ST7).

The non-contact power transmission system transitions from the state ST1 to the state ST2 when installation of the power-receiving-side instrument has been detected by the automatic intermittent operation (Q1), and returns to the state ST1 (Q2) when the position detection result is inappropriate (NG). When the position detection result is appropriate (OK), the non-contact power transmission system transitions to the state ST3. When ID authentication has been completed successfully (Q6), the non-contact power transmission system transitions to the normal power transmission state (ST4).

The non-contact power transmission system performs removal detection (Q12), metal detection (Q10), takeover state detection (Q17), and full-charge detection (Q14) in the normal power transmission state (ST4). The non-contact power transmission system returns to the initial state when one of these states has been detected (Q9, Q11, and Q13). When a full-charge state has been detected (Q14), the non-contact power transmission system transitions to the intermittent power transmission state ST7 (Q15). The non-contact power transmission system performs recharging necessity detection Q18 and removal detection Q16 in the intermittent power transmission state ST7. When removal of the power-receiving-side instrument 510 has been detected, the non-contact power transmission system returns to the initial state (Q20). When recharging is necessary, the non-contact power transmission system resumes normal power transmission (Q19).

The non-contact power transmission system that performs the basic sequence shown in FIGS. 6 and 7 can automatically detect installation of the power-receiving-side instrument (power transmission target). Therefore, the user need not operate a switch and the like. As a result, a convenient non-contact power transmission system is implemented. Since normal power transmission is performed after ID authentication has been completed successfully, power is not transmitted to an inappropriate instrument. Therefore, reliability and safety are improved. Various detection operations (i.e., removal detection, metal foreign object detection, takeover state detection based on secondary-side regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety). Moreover, since intermittent power transmission for monitoring the load state after full-charging (e.g., intermittent power transmission for removal detection and intermittent power transmission for recharge necessity determination) is performed when a full-charge state (a state in which the load is in a given state in a broad sense) has been detected, the operation that maintains the power-receiving-side instrument in an optimum state is continuously performed even after full-charging. This further satisfies the user.

Figure 8:
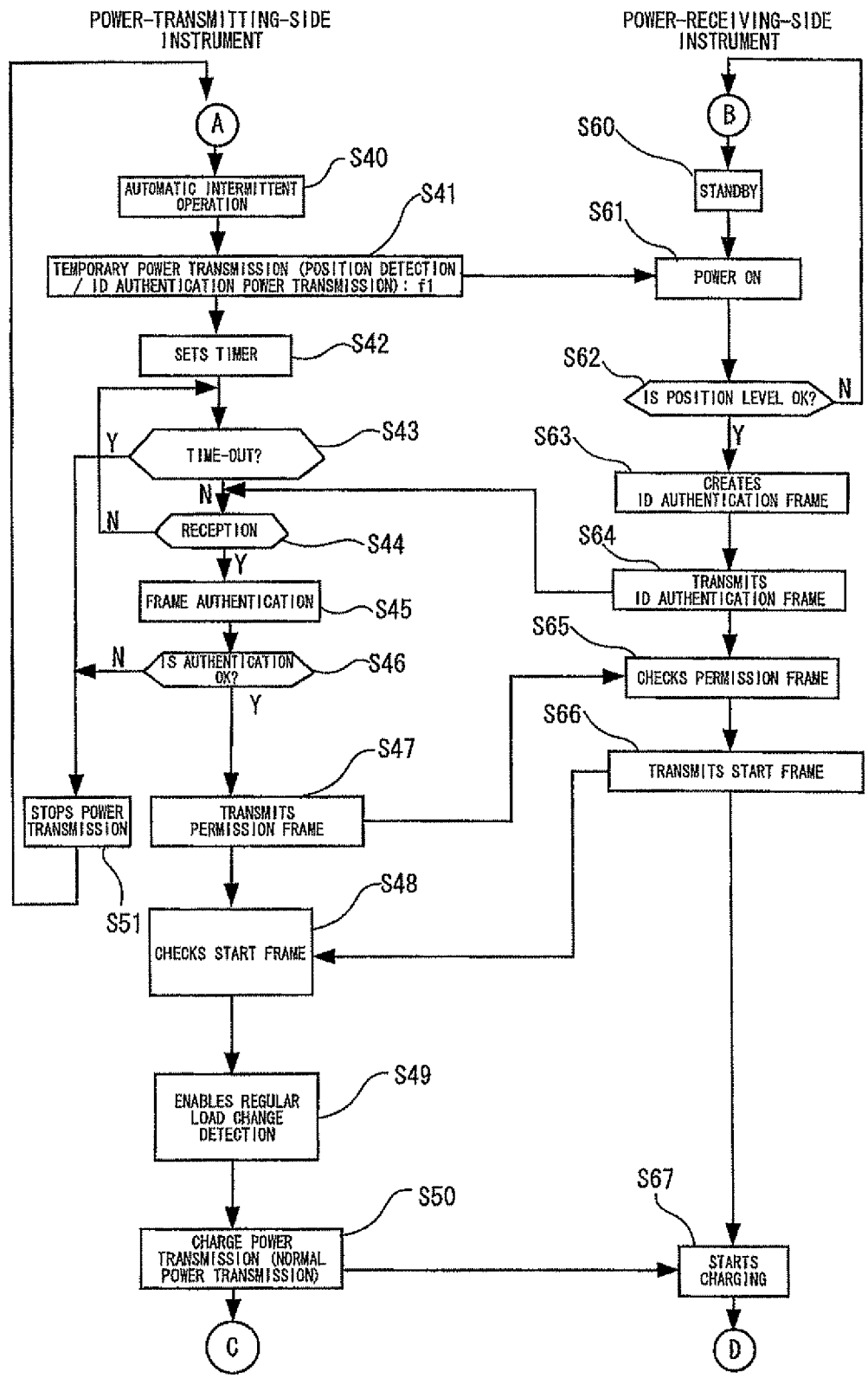
FIG. 8 is a flowchart showing an operation example of a non-contact power transmission system that performs the basic sequence shown in FIG. 6.
Figure 9:
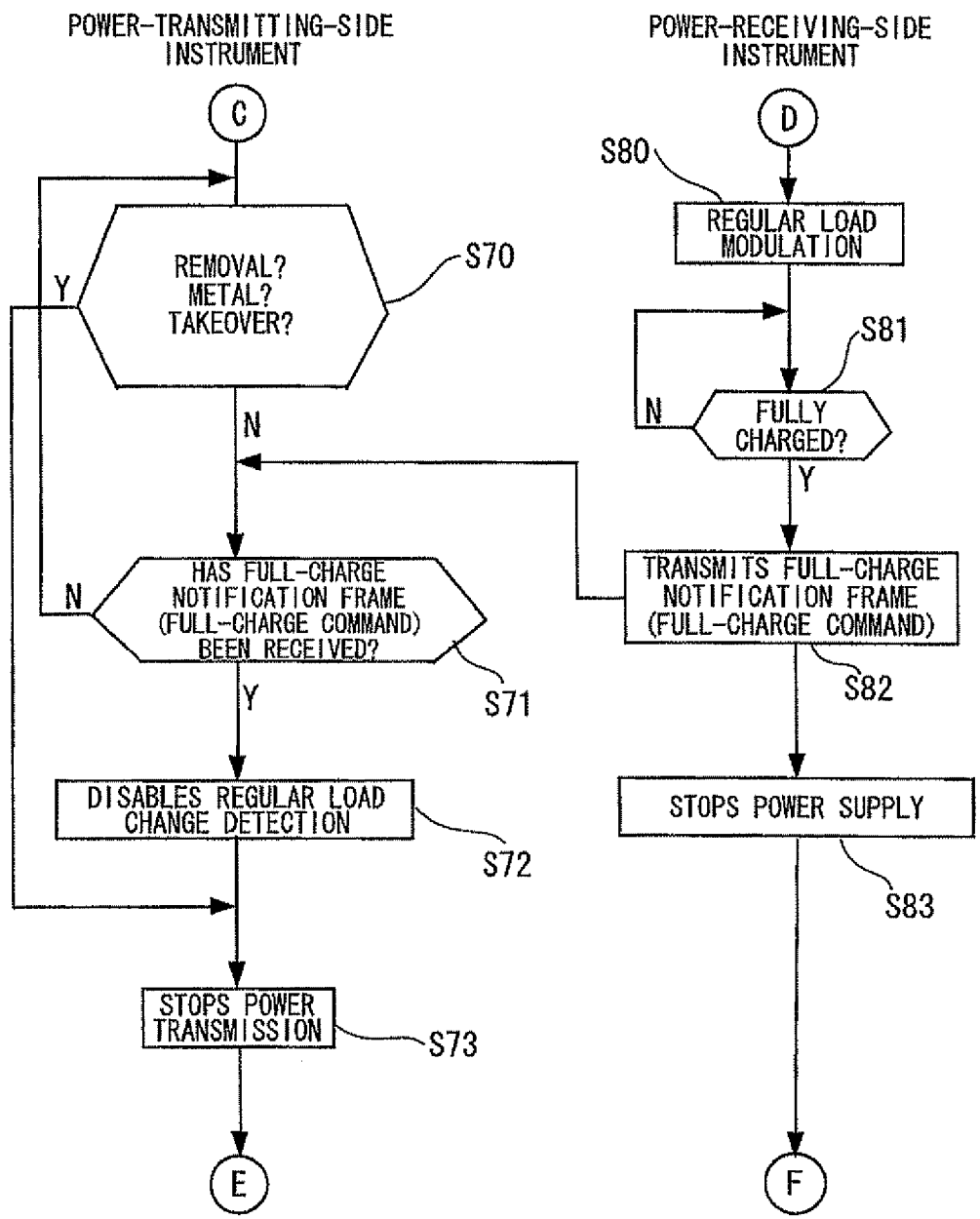
FIG. 9 is a flowchart showing an operation example of a non-contact power transmission system that performs the basic sequence shown in FIG. 6.

FIGS. 8 and 9 are flowcharts showing an operation example of the non-contact power transmission system that performs the basic sequence shown in FIG. 6. In FIGS. 8 and 9, the left side shows a power-transmitting-side (primary side) operation flow, and the right side shows a power-receiving-side (secondary-side) operation flow.

As shown in FIG. 8, the power-transmitting-side control circuit 22 performs the automatic intermittent operation (step S40). Specifically, the power-transmitting-side instrument performs temporary power transmission at given time intervals (e.g., the transmission frequency is f1; step S41), and a timer starts a count operation (step S42).

The power-receiving-side instrument transitions from a standby state (step S60) to a power-ON state (step S61) when the power-receiving-side instrument has received temporary power transmission, and determines the position level (position detection). When the position level is inappropriate (NG), the power-receiving-side instrument returns to the initial state (step S60). When the position level is appropriate (OK), the power-receiving-side instrument generates the ID authentication frame (S63), and transmits the ID authentication frame (step S64).

The power-transmitting-side instrument receives the ID authentication frame (step S44), and determines whether or not a timeout has occurred (step S43). When the power-transmitting-side instrument cannot receive the ID authentication frame within a given period of time, the power-transmitting-side instrument stops temporary power transmission (step S51), and returns to the initial state.

When the power-transmitting-side instrument has received the ID authentication frame within a given period of time, the power-transmitting-side instrument performs a frame authentication process (step S45). When authentication has succeeded (OK), the power-transmitting-side instrument transmits a permission frame to the power-receiving-side instrument (step S47). When authentication has failed (NG), the power-transmitting-side instrument stops temporary power transmission (step S51), and returns to the initial state.

The power receiving device 40 checks the permission frame transmitted from the power transmitting device 10 (step S65), and transmits a start frame to the power transmitting device 10 (step S66).

The power transmitting device 10 checks the start frame (step S48), enables regular load change detection (takeover state detection) (step S49), and starts normal power transmission (step S50). The power receiving device 40 receives normal power transmission, and starts charging the load (e.g., battery) (step S67).

FIG. 9 shows the subsequent flow. The power transmitting device 10 waits for the full-charge notification (power transmission stop request) from the power receiving device 40 (step S71) while performing removal detection, metal foreign object detection, and takeover state detection (step S70).

The power receiving device 40 performs regular load modulation for takeover detection while charging the load (step S80), and detects whether or not the load has been fully charged (step S81). Specifically, the full-charge detection circuit 62 determines that the load has been fully charged when the light-emitting diode LEDR has been turned OFF for a given period of time (e.g., 5 seconds). When the power receiving device 40 has detected that the load has been fully charged, the power receiving device 40 transmits the full-charge notification frame (save frame; power transmission stop request) to the power transmitting device 10 (step S82).

When the power transmitting device 10 has received the full-charge notification frame (save frame; power transmission stop request) from the power receiving device 40, the power transmitting device 10 disables regular load change detection (step S72), and stops power transmission (step S73).

Second Embodiment

This embodiment illustrates the details of takeover state detection (measures against takeover heat generation). The takeover state is considered to be a special form of foreign object insertion. The takeover state refers to a state in which the power-transmitting-side instrument continuously performs normal power transmission while erroneously regarding a foreign object as the power-receiving-side instrument. For example, when a thin metal sheet has been inserted between the primary coil and the secondary coil to block the primary coil and the secondary coil, since a considerable load is always present with respect to the power-transmitting-side instrument, it is difficult to detect removal of the power-receiving-side instrument, for example.

Measures Against Takeover Heat Generation

The takeover state is described in detail below. For example, a large foreign object may be inserted between the primary coil L1 and the secondary coil L2 after the power receiving device (or the power-receiving-side instrument) has been authenticated and normal power transmission has started. A metal foreign object can be detected by monitoring the induced voltage in the primary coil (L1), as described with reference to FIG. 13.

However, when a metal foreign object (e.g., thin metal sheet) that blocks the primary coil and the secondary coil has been inserted between the power-transmitting-side instrument and the power-receiving-side instrument (see FIG. 15B), the energy transmitted from the primary-side instrument is consumed by the metal foreign object (i.e., the metal foreign object serves as a load). Therefore, the power transmitting device 10 regards the metal foreign object as the load (power-receiving-side instrument). Therefore, removal of the power-receiving-side instrument may not be detected based on the induced voltage in the primary coil L1, as described with reference to FIG. 14, for example. In this case, power transmission from the power transmitting device 10 is continuously performed although the power-receiving-side instrument is absent so that the temperature of the metal foreign object increases to a large extent.

A phenomenon in which a metal foreign object takes over the power-receiving-side instrument 510 in this way is referred to as "takeover (phenomenon)". In order to improve the safety and the reliability of the non-contact power transmission system to a practical level, it is necessary to take sufficient measures against such takeover heat generation. A foreign object may be inserted accidentally or intentionally. When a foreign object that may take over the power-receiving-side instrument 510 has been inserted, a skin burn or damage to or destruction of the instrument may occur due to heat generation. Therefore, sufficient safety measures against foreign object insertion must be taken for the non-contact power transmission system. Measures against takeover heat generation are described in detail below.

Figure 15A:
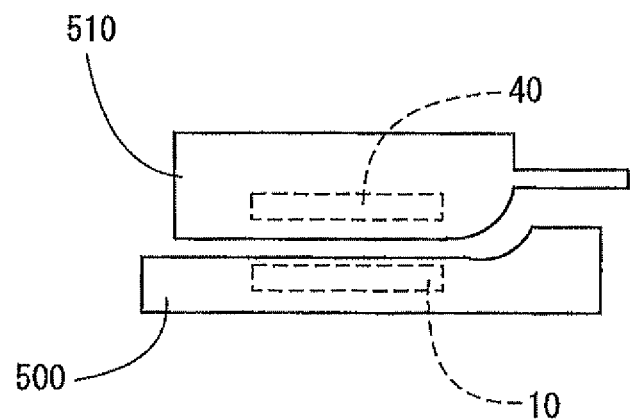
FIGS. 15A and 15B are cross-sectional views showing electronic instruments that form a non-contact power transmission system which are illustrative of foreign object insertion (takeover state) after normal power transmission has started.
Figure 15B:
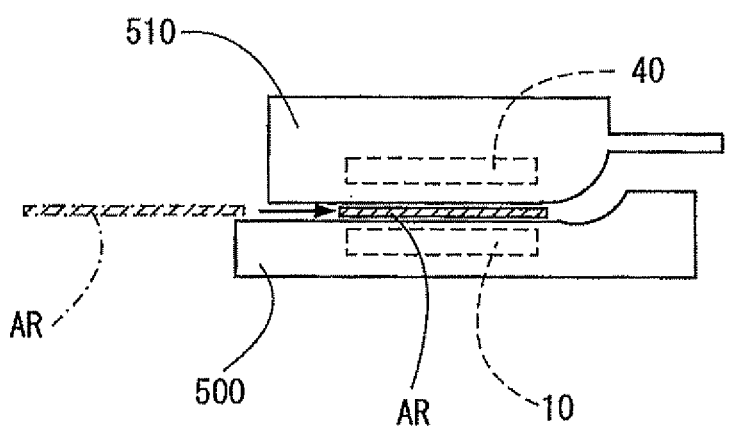

FIGS. 15A and 15B are cross-sectional views showing electronic instruments that form a non-contact power transmission system which are illustrative of insertion of a foreign object (takeover state) after normal power transmission has started.

In FIG. 15A, the portable telephone 510 (electronic instrument including the power receiving device 40) is placed at a predetermined position on the cradle 500 (electronic instrument including the power transmitting device 10). Non-contact power transmission is performed from the cradle 500 (charger) to the portable telephone 510 through the primary coil L1 and the secondary coil L2 so that the secondary battery (e.g., battery pack) 94 provided in the portable telephone 510 is charged.

In FIG. 15B, a thin sheet-shaped metal foreign object (conductive foreign object) AR is intentionally inserted between the cradle 500 (charger) and the portable telephone 510 during normal power transmission. When the foreign object AR has been inserted, power supplied from the primary-side instrument (cradle 500) to the secondary-side instrument (portable telephone terminal 510) is almost entirely consumed by the foreign object (AR) (i.e., the transmitted power is taken over), whereby the foreign object AR is likely to generate heat. Therefore, when the state shown in FIG. 15B has occurred, the power transmitting device 10 included in the primary-side instrument (cradle 500) must detect insertion of the foreign object AR and immediately stop normal power transmission.

However, it is difficult to detect the takeover state shown in FIG. 15B using the metal foreign object detection method described with reference to FIG. 13.

For example, the amplitude of the voltage induced in the primary coil L1 increases as the load of the power receiving device increases, and the amplitude of the voltage induced in the primary coil L1 decreases as the load of the power receiving device decreases. If the secondary battery 94 of the portable telephone 510 is normally charged, the load of the power receiving device 40 gradually decreases with the passage of time. When the load of the power receiving device 40 has rapidly increased, the power transmitting device 10 can detect the rapid increase in load since the power transmitting device 10 monitors a change in the load of the power receiving device 40. However, the power transmitting device 10 cannot determine whether the increase in load has occurred due to the load (secondary battery 94 of portable telephone terminal), mispositioning between the portable telephone terminal 510 and the cradle 500, or insertion of a foreign object. Therefore, insertion of a foreign object cannot be detected using the method in which the power transmitting device 10 merely detects a change in the load of the power receiving device 40.

In this embodiment, the power receiving device 40 intermittently changes the load of the power receiving device 40 during normal power transmission while supplying power to the load (e.g., secondary battery) (regular load modulation operation) to transmit information to the power transmitting device 10.

The following items are confirmed when the power transmitting device 10 has detected the information due to an intermittent change in load at a given timing.

(1) The instrument (i.e., portable telephone 510) including the power receiving device 40 is appropriately placed on the instrument (i.e., cradle 500) including the power transmitting device 10.

(2) The instrument (including the secondary battery of the portable telephone 510) including the power receiving device 40 is operating normally.

(3) The foreign object AR is not inserted.

When the foreign object AR has been inserted during normal power transmission, the information transmitted from the power receiving device 40 is blocked by the foreign object AR and does not reach the power transmitting device 10. Specifically, the power transmitting device 10 cannot detect an intermittent (e.g., regular) change in the load of the power receiving device. It is most likely that an intermittent change in load cannot be detected after the above-mentioned items (1) to (3) have been confirmed because the foreign object AR has been inserted (item (3)). Specifically, the power transmitting device 10 can determine that the power transmitting device 10 has become unable to detect an intermittent change in load due to insertion of the foreign object AR.

Figure 16A:
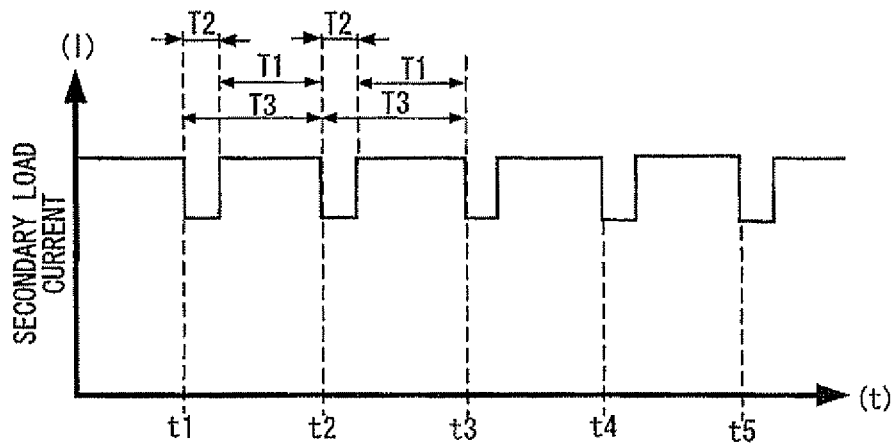
FIGS. 16A and 16B are views illustrative of a specific embodiment when intermittently changing a power-receiving-side load so that insertion of a foreign object can be detected.
Figure 16B:
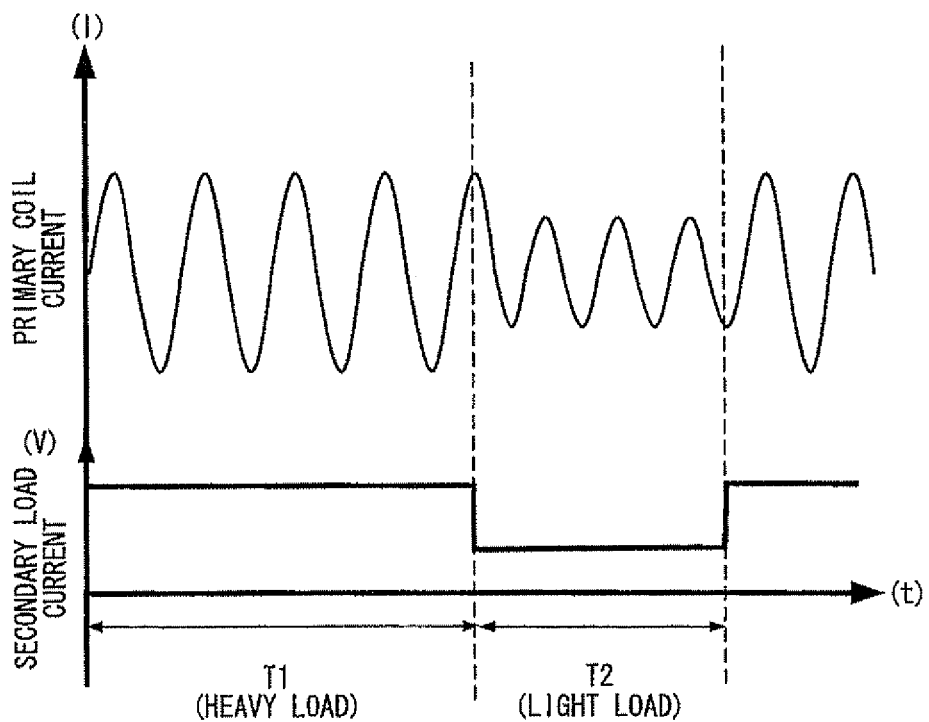

FIGS. 16A and 16B are views illustrative of a specific embodiment when intermittently changing the load of the power receiving device so that insertion of a foreign object can be detected.

In FIG. 16A, an intermittent change in the load of the power receiving device is indicated by a change in secondary current (current that flows through the secondary coil L2). As shown in FIG. 16A, the load of the power receiving device intermittently changes at times t1, t2, t3, t4, t5, . . . .

In FIG. 16A, the load changes in a cycle T3. The load decreases in a period T2 starting from the time t1, and increases in the subsequent period T1, for example. Such a cyclic change in load is repeated in the cycle T3.

FIG. 16B shows a change in primary coil voltage (induced voltage at one end of the primary coil) with respect to a change in secondary load current. The secondary-side load is heavy in the period T1, and is light in the period T2, as described above. The amplitude (peak value) of the induced voltage (primary coil voltage) at one end of the primary coil (L1) changes corresponding to the change in secondary-side load. Specifically, the amplitude increases in the period T1 in which the load is heavy, and decreases in the period T2 in which the load is light. Therefore, the power transmitting device 10 can detect a change in the load of the power receiving device 40 by detecting the peak of the primary coil voltage using the waveform detection circuit 28 (see FIG. 2), for example. Note that the load change detection method is not limited to the above-described method. For example, the phase of the primary coil voltage or the phase of the primary coil current may be detected.

The load can be easily modulated by switching the transistor, for example. The peak voltage of the primary coil or the like can be accurately detected using an analog or digital basic circuit. Therefore, the above method does not impose load on the instrument to a large extent while facilitating implementation. The above-described method is also advantageous in terms of a reduction in mounting area and cost.

As described above, insertion of a foreign object can be easily and accurately detected without adding a special configuration by employing a novel method in which the power receiving device 40 transmits information obtained by intermittently (and cyclically) changing the load during normal power transmission and the power transmitting device 10 detects the change in load.

Specific Example of Detection of Foreign Object Insertion

Figure 17:
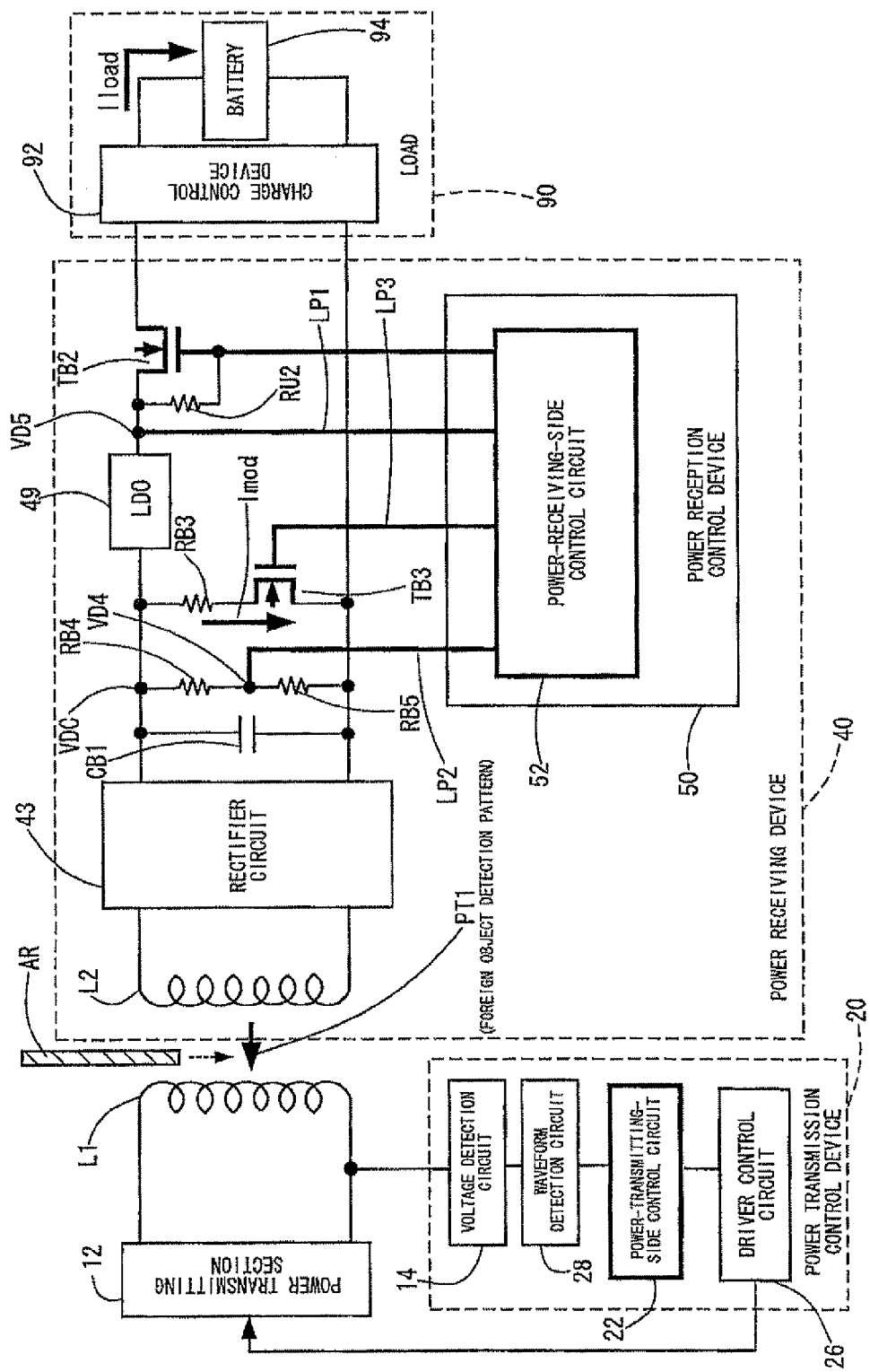
FIG. 17 is a circuit diagram showing the main configuration of the non-contact power transmission system shown in FIG. 2 relating to detection of foreign object insertion (takeover state).

FIG. 17 is a circuit diagram showing the main configuration of the non-contact power transmission system shown in FIG. 2 relating to detection of foreign object insertion (takeover state). In FIG. 17, the same sections as in FIG. 2 are indicated by the same reference symbols. In FIG. 17, a bold line indicates a portion that plays an important role in detecting foreign object insertion.

A notable circuit configuration of the power receiving device 40 shown in FIG. 17 includes the load modulation transistor TB3 of the load modulation section 46 (see FIG. 2), the power supply control transistor TB2 of the power supply control section 48 (see FIG. 2), and the power-receiving-side control circuit 52 that ON/OFF-controls these transistors (TB2 and TB3). It is also important that the voltages at the input terminal and the output terminal of the series regulator (LDO) 49 are input to the power-receiving-side control circuit 52 through the signal lines LP2 and LP1 so that the load state (degree of load) of the battery 94 (secondary battery) included in the load 90 can be detected by monitoring the voltage across the series regulator (LDO) 49.

The configuration of the power transmission control device 20 of the power transmitting device 10 (see FIG. 2) is also important. Specifically, it is important that the peak value (amplitude) of the induced voltage in the primary coil (L1) is detected by the waveform detection circuit 28 and a change in the load of the power receiving device 40 is detected by the power-transmitting-side control circuit 22.

In FIG. 17, the power receiving device 40 modulates the load during normal power transmission (continuous power transmission after authentication), and transmits a foreign object detection pattern PT1 to the power transmitting device 10. The power-transmitting-side control circuit 22 of the power transmitting device 10 (successively or intermittently) monitors a change in the load of the power receiving device 40 during normal power transmission. The power-transmitting-side control circuit 22 determines that the foreign object AR has been inserted when the power-transmitting-side control circuit 22 has become unable to receive the foreign object detection pattern PT1, and stops normal power transmission.

Specific Embodiment of Foreign Object Detection Pattern PT1

Figure 18A:
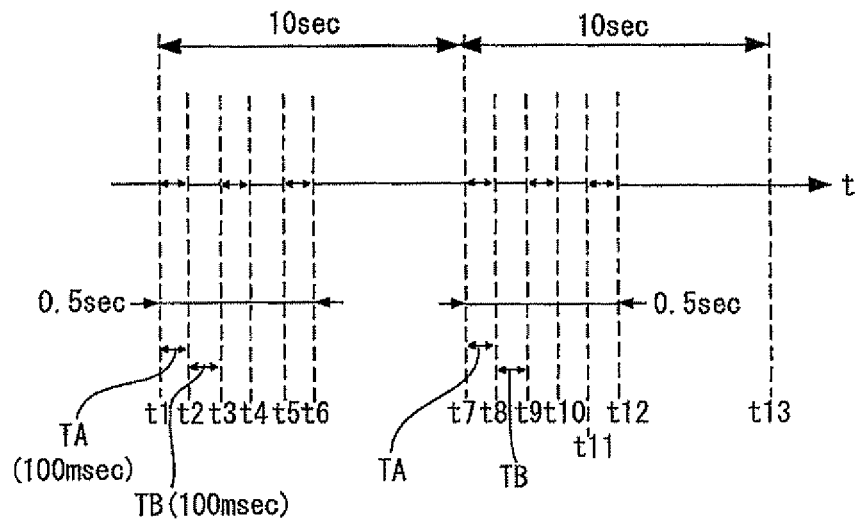
FIGS. 18A and 18B are views illustrative of a specific preferred embodiment of load modulation that enables foreign object detection.
Figure 18B:
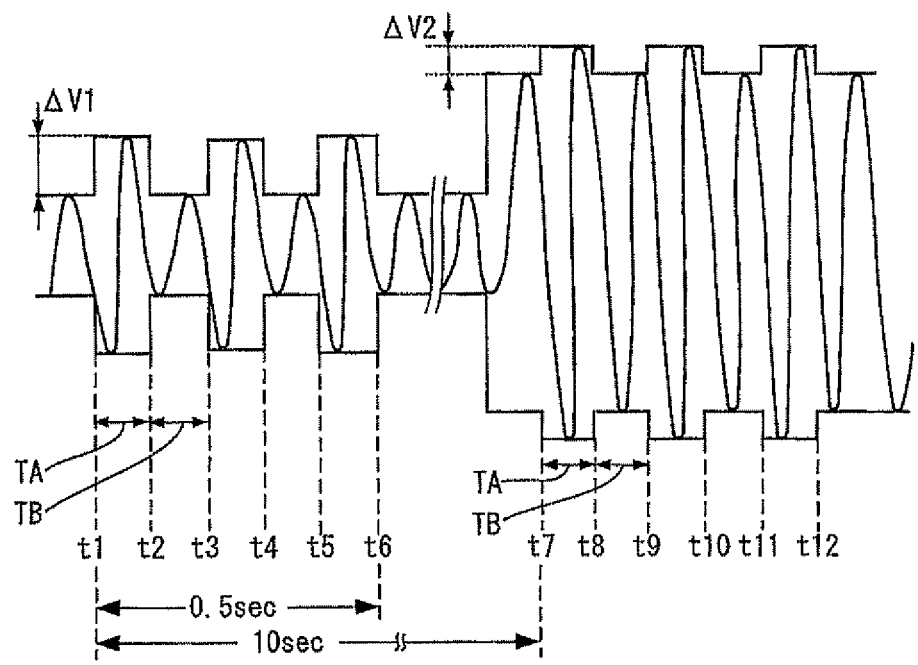

FIGS. 18A and 18B are views illustrative of a specific preferred embodiment of load modulation that enables foreign object detection. FIG. 18A is a view showing a load modulation timing example, and FIG. 18B is a view showing a change in the load of the power receiving device detected by the power transmitting device in detail.

As shown in FIG. 18A, load modulation that enables foreign object detection is cyclically (regularly) performed in a cycle of 5 seconds (10 seconds), for example.

Load modulation that enables foreign object detection is performed in a period from a time t1 to a time t6 and a period from a time t7 to a time t12. The period from the time t1 to the time t6 (from the time t7 to the time t12) is 0.5 seconds. The degree of load is changed in units of 0.1 seconds (100 msec) obtained by equally dividing 0.5 seconds by five.

In FIG. 18A, a bold bidirectional line indicates a period in which the load is heavy. Specifically, the load increases in a period from the time t1 to the time t2, a period from the time t3 to the time t4, a period from the time t5 to the time t6, a period from the time t7 to the time t8, a period from the time t9 to the time t10, and a period from the time t11 to the time t12. A period in which the load increases is referred to as a period TA.

The load decreases in a period from the time t2 to the time t3, a period from the time t4 to the time t5, a period from the time t9 to the time t9, and a period from the time t10 to the time t11. A period in which the load decreases is referred to as a period TB.

In FIG. 18A, the load of the power receiving device is intermittently changed cyclically (i.e., in cycle units (in units of one cycle)) during normal power transmission, and the load is intermittently changed a plurality of times at given intervals within one cycle.

The power transmitting device 10 and the power receiving device 40 can transfer the information relating to a change in load in synchronization by cyclically changing the load (i.e., the power transmitting device 10 can easily determine the timing at which the load of the power receiving device 40 changes).

In FIG. 18A, the load is intermittently changed a plurality of times at given intervals only in a given period (from the time t1 to the time t6) within one cycle (e.g., from the time t1 to the time t7). Specifically, the load is modulated only in the first period (0.5 seconds) of one cycle (10 seconds). The reasons that the load is modulated in this manner are as follows.

Specifically, since a change in load (load modulation) during normal power transmission may affect power supply to the load (battery 94 shown in FIG. 17), it is undesirable to frequently change the load to a large extent. Therefore, one cycle of load modulation is increased to some extent (a foreign object can be detected even if the cycle of load modulation is increased to some extent).

The load is intermittently changed a plurality of times at given intervals only in a given period within one cycle. Specifically, when the load change interval is increased to a large extent, the power transmitting device may not appropriately detect an intermittent change in the load of the power receiving device due to a change in the load state of the load with the passage of time or a change in surrounding conditions. Therefore, one cycle is increased (10 seconds in FIG. 18A), and the load is intermittently modulated a plurality of times (five times in FIG. 18A) only in a short period (0.5 seconds in FIG. 18A) within one cycle, for example.

The power transmitting device 10 can detect a foreign object (AR) with high accuracy while minimizing an effect on power supply to the load (battery 94) (e.g., charging a battery pack) by performing load modulation in this manner.

FIG. 18B shows an example of a change in the amplitude of the induced voltage at one end of the primary coil (L1) of the power transmitting device 10 corresponding to the load of the power receiving device. In FIG. 18B, the load state of the load (battery 94) differs between a load modulation period (t1 to t6) in the first cycle and a load modulation period (t7 to t12) in the second cycle. The load state of the load (battery 94) increases in the second cycle so that the peak value of the primary coil voltage increases.

At the time t1 to the time t6 in FIG. 18B, the difference between the primary coil voltage in the period TA in which the load increases and the primary coil voltage in the period TB in which the load decreases is $\Delta V1$. The power-transmitting-side control circuit 22 of the power transmitting device 10 can detect a change in the load of the power receiving device 40 from the difference $\Delta V1$ in the amplitude of the primary coil voltage.

In the second load modulation period (t7 to t12), since the load state of the load (battery 94) increases so that a charging current (Iload) supplied to the load 94 increases, the ratio of a modulation current (Imod) due to load modulation to the charging current (Iload) decreases so that the difference in primary coil voltage caused by turning the modulation current (Imod) ON/OFF decreases to $\Delta V2$ ($\Delta V2 < \Delta V1$). Specifically, the modulation current (Imod) is buried in the charging current (Iload) supplied to the load battery 94). Therefore, when the load (battery 94) is heavy, it is difficult for the power transmitting device 10 to detect a change in load as compared with the case where the load is light. In this embodiment, the load state of the load (battery 94) is compulsorily reduced by reducing the amount of power supplied to the load (battery 94) so that the primary-side device can easily detect a change in load due to load modulation. The load reduction measures are described below.

Compulsory Load Reduction Measures

In the invention, since load modulation is performed without stopping power supply to the load 94 during normal power transmission, transmission of the signal due to load modulation to the power transmitting device 10 is always affected by the state of power supply to the load 94 (i.e., the load state of the load).

As described above, even if a small current is turned ON/OFF for load modulation when a large amount of charging current is supplied to the load 94 (e.g., battery pack), since the amount of ON/OFF current (Imod) is smaller than the amount of charging current (Iload) supplied to the load (battery 94), it is difficult for the power transmitting device 10 to detect a change in load due to load modulation (i.e., it is difficult for the power transmitting device 10 to detect whether a change in load is noise or a signal due to load modulation). On the other hand, the relative ratio of the ON/OFF current (Imod) due to load modulation increases when the amount of current supplied to the load 94 is small (when the load is light), so that the power transmitting device 10 can easily detect a change in load due to the ON/OFF operation.

According to this embodiment, the power receiving device 40 monitors the load state of the load 94 during normal power transmission, and the amount of power supplied to the load 94 is compulsorily reduced based on the above consideration when the load 94 is heavy (i.e., a large amount of current is supplied to the load 94) when the power receiving device 40 performs load modulation that enables foreign object detection. The amount of power supplied to the load 94 may be reduced by temporarily (or intermittently) stopping power supply.

Since the load state of the load 94 is apparently reduced by reducing the amount of power supplied to the load 94, the power transmitting device 10 can easily detect the signal due to load modulation. Therefore, the foreign object detection accuracy is maintained at a desired level even when the load 94 is heavy. Since at least a minimum amount of power is always supplied to the load 94 even when compulsorily reducing the load 94, a problem in which the electronic circuit (charge control device 92) of the load 94 cannot operate does not occur.

Moreover, since load modulation that enables detection of foreign object insertion is intermittently performed at appropriate intervals taking the effect on power supply to the load 94 into consideration, power supply to the load 94 is not adversely affected even if the load is compulsorily reduced. For example, a problem in which the charging time of the battery pack increases to a large extent does not occur.

Therefore, the load change detection accuracy of the power transmitting device 10 can be maintained at a desired level even if the load 94 is heavy by causing the power receiving device 40 to monitor the state of the load 94 and compulsorily reduce the load state of the load 94, as required, when performing load modulation which enables detection of insertion of a foreign object.

FIGS. 19A to 19E are views illustrative of the load reduction operation. FIG. 19A is a view showing a state in which the load state of the load is light. FIG. 19B is a view showing a state in which the load state of the load is heavy. FIG. 19C is a view showing a change in primary coil voltage in the state shown in FIG. 19B. FIG. 19D is a view showing a state in which the load is reduced by causing the power supply control transistor to be turned ON/OFF or setting the power supply control transistor in a half ON state. FIG. 19E is a view showing a change in primary coil voltage in the state shown in FIG. 19D.

In FIG. 19A, since the load (battery) 94 is light (i.e., the charging current Iload supplied to the load is small), the power transmitting device 10 can sufficiently detect a change in load due to load modulation without causing the power receiving device 40 to perform the operation of reducing the load. Therefore, the power supply control transistor TB2 is always turned ON. The load modulation transistor TB3 is intermittently turned ON/OFF to implement load modulation.

In FIG. 19B, since the load (battery) 94 is heavy (i.e., the charging current Iload supplied to the load is large), a change in modulation current (Imod) due to the ON/OFF operation is observed to only a small extent. As shown in FIG. 19C, when the load increases, the difference in amplitude of the primary coil voltage decreases from $\Delta V1$ to $\Delta V2$, whereby it becomes difficult to detect a change in load due to load modulation.

In FIG. 19D, the power receiving device 40 performs the operation that reduces the load when performing load modulation. In FIG. 19D, the power receiving device 40 causes the power supply control transistor TB2 to be successively turned ON/OFF, or sets the power supply control transistor TB2 in a half ON state.

Specifically, the amount of power supplied to the load 94 can be compulsorily reduced (power supply may be temporarily stopped) using a digital method which causes the power receiving device 40 to successively turn the power supply control transistor TB2 provided in a power supply path ON/OFF to intermittently supply power to the load 94. An operation of successively switching a transistor is generally employed for a digital circuit, and is easily implemented. Moreover, it is possible to accurately reduce the amount of power supplied to the load by selecting the switching frequency.

The amount of power supplied to the load 94 can also be reduced using an analog method in which an intermediate voltage between a complete ON voltage and a complete OFF voltage is supplied to the gate of the power supply control transistor (PMOS transistor) to set the PMOS transistor in a half ON state. This method has an advantage in that the on-resistance of the power supply control transistor (PMOS transistor) can be finely adjusted by controlling the gate voltage.

In FIG. 19E, the amplitude of the primary coil voltage in a state in which the load is heavy changes from V10 to V20 by compulsorily reducing the load. In FIG. 19E, "X" indicates the amount by which the load 94 is compulsorily reduced. The difference in amplitude of the primary coil voltage increases from $\Delta V2$ (see FIG. 19C) to $\Delta V3$ ($\Delta V3 > \Delta V2$) by compulsorily reducing the load 94, whereby the power transmitting device 10 can easily detect a change in the load of the power receiving device 40 due to load modulation.

The power transmitting device can reliably detect a change in load even when the load is heavy by causing the power receiving device to reduce the load (including temporarily stopping the load current) while performing load modulation.

Specific Operation of Power Transmitting Device

A specific operation of the power transmission control device 20 shown in FIG. 17 is described below. As described above, the regular load change detection section 14 (see FIG. 5) of the power-transmitting-side control circuit 22 included in the power transmission control device 20 determines that a foreign object (AR) has been inserted between the primary coil (L1) and the secondary coil (L2) when the regular load change detection section 14 cannot detect an intermittent change in the load of the power receiving device 40 during normal power transmission, and stops power transmission. This reliably prevents heat generation from the foreign object (AR), a skin burn, and damage to and destruction of the instrument. Therefore, highly reliable foreign object insertion measures are implemented for a non-contact power transmission system.

Since it is necessary to carefully determine the presence or absence of insertion of a foreign object, it is preferable that the power-transmitting-side control circuit 22 detect a change in load in cycle units and determine that a foreign object has been inserted between the primary coil and the secondary coil when the power-transmitting-side control circuit 22 cannot detect a change in load over a given number of cycles.

For example, the power-transmitting-side control circuit 22 detects a change in the load of the power receiving device in cycle units, and stops normal power transmission when the power-transmitting-side control circuit 22 cannot detect a change in load over a given number of cycles (e.g., three cycles). This increases the foreign object insertion detection accuracy, thereby preventing a situation in which the power-transmitting-side control circuit 22 erroneously stops normal power transmission when a change in load cannot be detected due to an accidental factor.

A change in the load of the power receiving device 40 can be detected by detecting the waveform of the induced voltage in the primary coil (L1). The waveform can be detected by the waveform detection circuit 22.

Since the peak value (amplitude) of the waveform of the induced voltage in the primary coil (L1) increases when the load of the power receiving device 40 is heavy and decreases when the load of the power receiving device 40 is light, a change in the load of the power receiving device 40 can be detected by detecting the peak of the waveform. Note that the load change detection method is not limited to the above-described method. For example, a change in load may be detected by detecting the phase of the induced voltage or current in the primary coil.

According to this embodiment, a novel power transmitting device 10 having a function of detecting foreign object insertion (takeover) by regular load authentication is implemented. According to this embodiment, insertion of a foreign object between the primary coil and the secondary coil can be accurately detected by simple signal processing while reducing the number of parts to implement highly reliable safety measures relating to non-contact power transmission.

Moreover, the power transmission stop function due to regular load authentication can be utilized to compulsorily stop inappropriate power transmission in addition to detect the takeover state. For example, power transmission from the power-transmitting-side instrument is reliably stopped even when removal of the power-receiving-side instrument has not been detected for some reason or the power-receiving-side instrument cannot perform regular load modulation due to breakage or failure. Therefore, the safety and the reliability of the non-contact power transmission system are remarkably improved by providing the regular load authentication function.

Third Embodiment

This embodiment illustrates recharging after full-charging. When the portable telephone (power-receiving-side instrument) that has been fully charged is placed on the charger (cradle) for a long period of time, the voltage of the battery may decrease due to discharging so that the battery may require recharging, for example. In this embodiment, the power transmitting device can automatically detect necessity of recharging after full-charging.

Recharging After Full-Charging

Figure 10A:
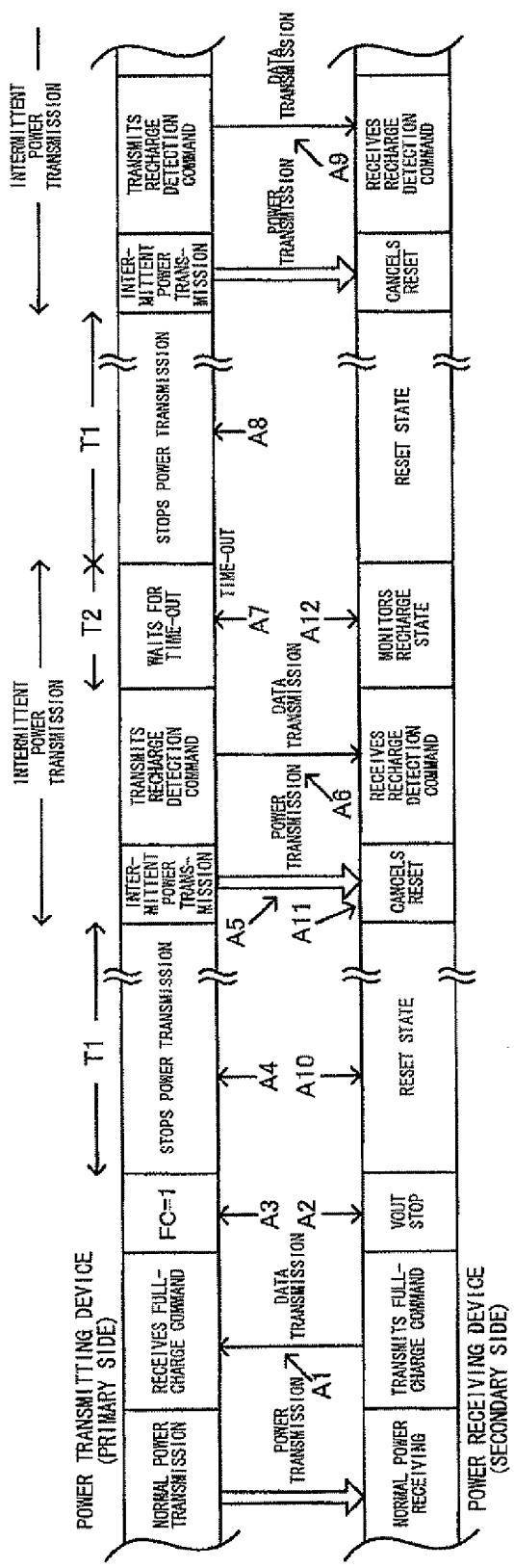
FIGS. 10A and 10B are sequence diagrams showing a series of processes of a non-contact power transmission system that manages recharging after full-charging.
Figure 10B:
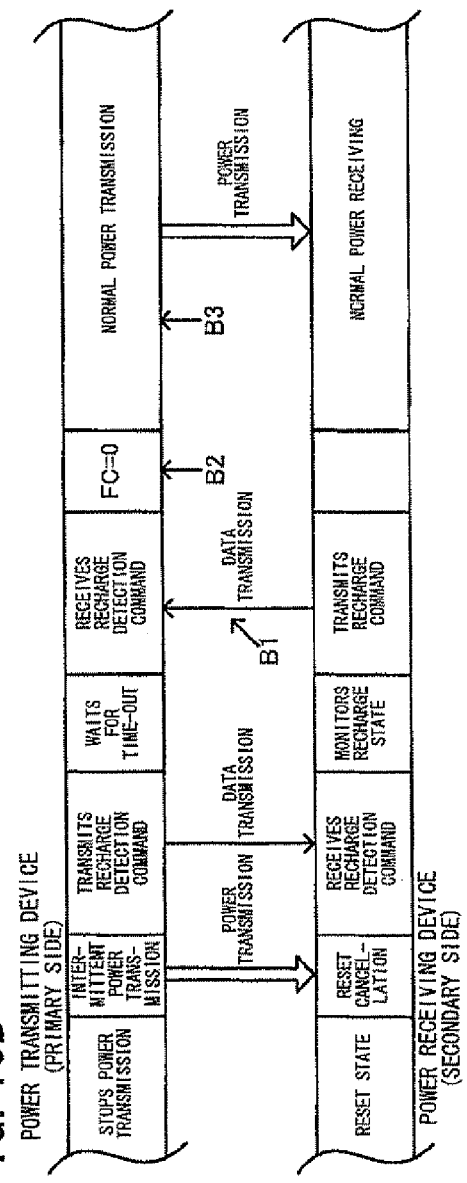

FIGS. 10A and 10B are sequence diagrams showing a series of processes of the non-contact power transmission system that manages recharging after full-charging. The process shown in FIG. 10B is performed after the process shown in FIG. 10A.

The non-contact power transmission system transitions to a post-full-charge standby mode when the battery 94 (see FIG. 2) has been fully charged. In the post-full-charge standby mode, the power transmitting device 10 intermittently transmits power to the power receiving device 40 while notifying the power receiving device 40 that the power transmitting device 10 is set in the post-full-charge standby mode. When the power receiving device 40 has been notified that the power transmitting device 10 is set in the post-full-charge standby mode, the power receiving device 40 checks the battery voltage VBAT. When the battery voltage VBAT is equal to or less than the recharge voltage (e.g., 3.9 V), the power receiving device 40 determines that the battery 94 requires recharging, and transmits a recharge command to the power transmitting device 10. Therefore, the power transmitting device 10 resumes normal power transmission to the power receiving device 40. As a result, the battery 94 is recharged. The post-full-charge standby mode is canceled at this time. When the battery voltage VBAT is higher than the recharge voltage, the post-full-charge standby mode is maintained. The details are described below.

When the power receiving device 40 has detected that the battery 94 of the load has been fully charged, the power-transmitting-side control circuit 22 shown in FIG. 2 stops normal power transmission to the power receiving device 40 and performs intermittent power transmission. When the power receiving device 40 has detected that the battery 94 requires recharging during the intermittent power transmission period, the power-transmitting-side control circuit 22 resumes normal power transmission to the power receiving device 40.

When the battery 94 has been fully charged so that the power transmitting device 1O has stopped normal power transmission and then intermittently transmitted power, the power-receiving-side control circuit 52 shown in FIG. 2 transmits a recharge command that indicates information relating to the recharge state of the battery 94 to the power transmitting device 10 in the intermittent power transmission period. In this case, the full-charge state of the battery 94 is detected by the full-charge detection circuit 62, and the recharge state of the battery 94 is monitored by the recharge monitor circuit 64. The term "information relating to the recharge state" refers to information used to determine whether or not the battery 94 requires recharging, and includes information relating to whether or not the battery 94 requires recharging and information relating to the battery voltage VBAT after the battery 94 has been fully charged.

Specifically, as indicated by A1 in FIG. 10A, when the battery 94 has been fully charged, the power-receiving-side control circuit 52 transmits a full-charge command (full-charge information) which indicates that the battery 94 has been fully charged to the power transmitting device 10 by means of load modulation performed by the load modulation section 46, for example. As indicated by A2, the control circuit 52 then stops outputting (supplying) the voltage VOUT to the charge control device 92. For example, the control circuit 52 determines that the battery 94 has been fully charged (charging has been completed) when the full-charge detection circuit 62 has detected that the light-emitting device LEDR used to display the charge state has been turned OFF for 5 seconds, for example. The control circuit 52 then generates a frame for transmitting the full-charge command, and transmits the generated frame to the power transmitting device 10 by means of load modulation by controlling a signal P3Q.

When the power-transmitting-side control circuit 22 has received the full-charge command during normal power transmission to the power receiving device 40, the control circuit 22 sets a full-charge flag FC to "1", as indicated by A3 in FIG. 10A, and stops power transmission to the power receiving device 40 for the first period T1 (e.g., 1 second), as indicated by A4. The control circuit 22 then resumes power transmission (intermittent power transmission), as indicated by A5. The control circuit 22 transmits a recharge detection command which instructs the power receiving device 40 to perform detection of the recharge state of the battery 94 (detection of whether or not the battery 94 requires recharging or detection of the battery voltage after the battery 94 has been fully charged) in the intermittent power transmission period after resuming power transmission, as indicated by A6. Specifically, the power transmitting device 10 generates a frame of the recharge detection command using the method described with reference to FIG. 3A, and transmits the generated frame to the power receiving device 40. When the control circuit 22 has not received the recharge command from the power receiving device 40 until a timeout wait period T2 (e.g., 30 msec; T2<T1 (power transmission suspension period)) has elapsed after the control circuit 22 has transmitted the recharge detection command, the control circuit 22 determines that a timeout has occurred, as indicated by A7. When a timeout has occurred, the control circuit 22 again stops power transmission to the power receiving device 40 for the period T1, as indicated by A8, and again transmits the recharge detection command to the power receiving device 40 in the intermittent power transmission period after resuming power transmission, as indicated by A9. Note that the power transmission suspension period T1 may be referred to as a first period, and the timeout wait period T2 may be referred to as a second period.

As indicated by A10 in FIG. 10A, when power transmission from the power transmitting device 10 has been stopped after the power reception control device 50 has transmitted the full-charge command, the power reception control device 50 is reset. Specifically, the power supply voltage becomes 0 V since power is not supplied from the power transmitting device 10 so that the power reception control device 50 is reset. When the power-receiving-side control circuit 52 has received the recharge detection command from the power transmitting device 10 after the reset state has been canceled by intermittent power transmission from the power transmitting device 10, as indicated by A11, the power-receiving-side control circuit 52 monitors the recharge state of the battery 94, as indicated by A12. Specifically, the power-receiving-side control circuit 52 monitors and determines whether or not the battery 94 requires recharging. Alternatively, the power-receiving-side control circuit 52 may monitor the battery voltage VBAT and transmit information relating to the battery voltage VBAT to the power transmitting device 10. The power-receiving-side control circuit 52 monitors the recharge state of the battery 94 based on the monitoring result of the recharge monitor circuit 64 shown in FIG. 2.

At B1 in FIG. 10B, the power-receiving-side control circuit 52 transmits the recharge command which indicates information relating to the recharge state of the battery 94 to the power transmitting device 10. For example, when the power-receiving-side control circuit 52 has determined that the battery 94 requires recharging based on the monitoring result of the recharge monitor circuit 64, the power-receiving-side control circuit 52 transmits the recharge command to the power transmitting device 10. When the power-transmitting-side control circuit 22 has received the recharge command from the power receiving device 40, the power-transmitting-side control circuit 22 resets the full-charge flag FC to "0", as indicated by B2, and resumes normal power transmission to the power receiving device 40, as indicated by B3. Specifically, the power-transmitting-side control circuit 22 resumes normal power transmission when the power-transmitting-side control circuit 22 has determined that the battery 94 requires recharging based on the recharge command. As a result, the battery 94 starts to be recharged so that the battery 94 of which the voltage has decreased can be recharged.

Figure 11:
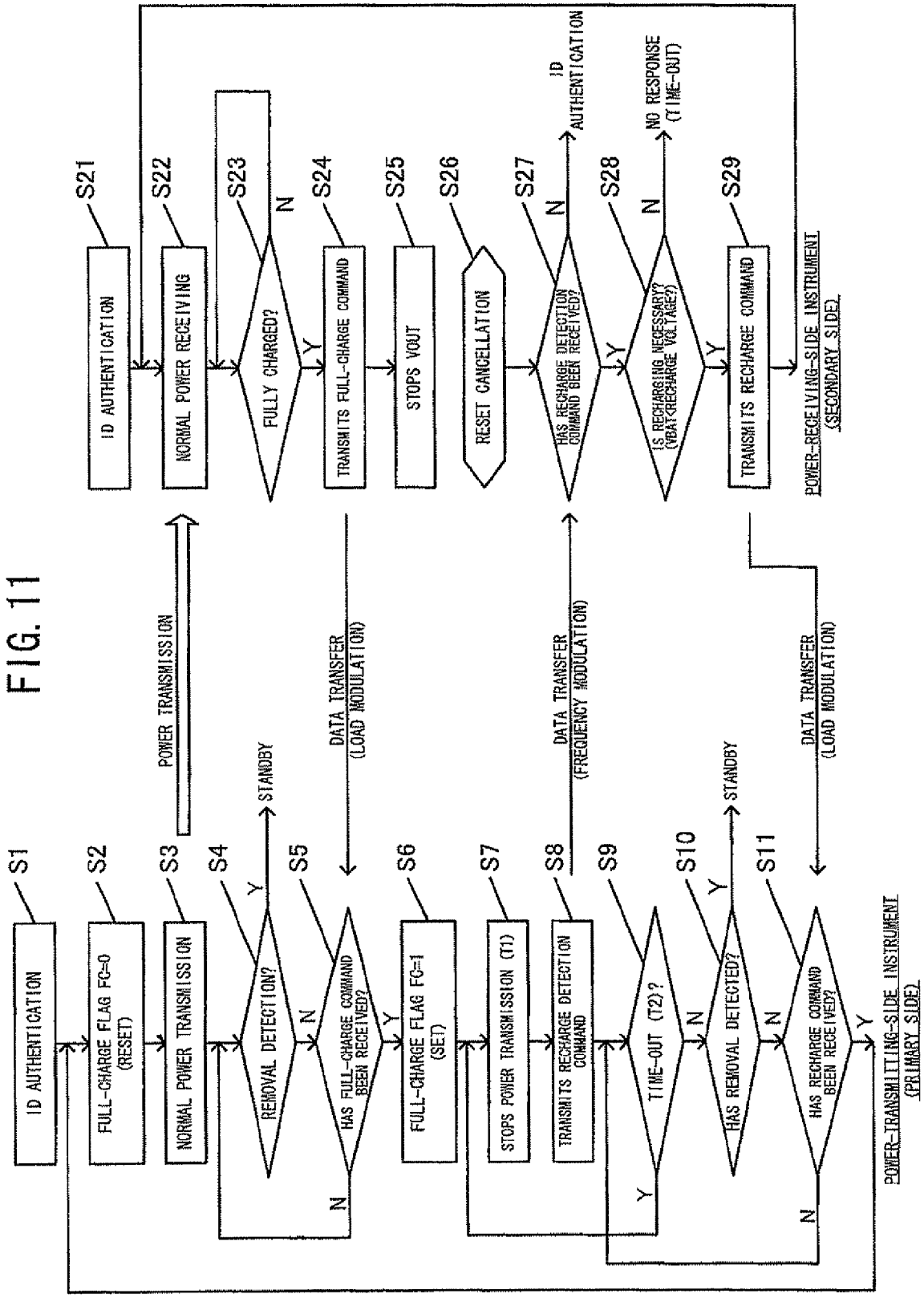
FIG. 11 is a flowchart showing the process of a non-contact power transmission system that automatically performs ID authentication, normal power transmission, full-charge detection, and recharge management.

FIG. 11 shows a summary of the process of the non-contact power transmission system that automatically performs ID authentication, normal power transmission, full-charge detection, and recharge management. FIG. 11 is a flowchart showing the process of the non-contact power transmission system that automatically performs ID authentication, normal power transmission, full-charge detection, and recharge management.

The power-transmitting-side process is as follows. When the power-transmitting-side instrument (primary-side instrument) has completed ID authentication with regard to the power-receiving-side instrument (secondary-side instrument), the power-transmitting-side instrument resets the full-charge flag FC to "0" (steps S1 and S2). The power-transmitting-side instrument then starts normal power transmission to the power-receiving-side instrument (step S3). The power-transmitting-side instrument then performs removal (leave) detection (step S4). When the power-transmitting-side instrument has detected removal (leave) of the power-receiving-side instrument, the power-transmitting-side instrument transitions to the normal standby mode. Specifically, the power-transmitting-side instrument detects removal when the portable telephone 510 has been physically separated from the charger 500 in FIG. 1A so that a magnetic flux of the primary coil L1 does not pass through the secondary coil L2, and then transitions to the normal standby mode. In the normal standby mode, the power-transmitting-side instrument does not perform intermittent power transmission, differing from the post-full-charge standby mode. The power-transmitting-side instrument completely stops power transmission until the portable telephone 510 is again placed on the charger 500.

The power-transmitting-side instrument determines whether or not the full-charge command has been received from the power-receiving-side instrument (step S5). When the power-transmitting-side instrument has determined that the full-charge command has not been received from the power-receiving-side instrument, the power-transmitting-side instrument returns to the step S4. When the power-transmitting-side instrument has determined that the full-charge command has been received from the power-receiving-side instrument, the power-transmitting-side instrument sets the full-charge flag FC to "1" (step S6). The power-transmitting-side instrument then stops power transmission to the power-receiving-side instrument during the first period (power transmission suspension period) T1 (step S7). The period T1 is measured by a count process based on a power-transmitting-side clock signal.

When the first period T1 has elapsed, the power-transmitting-side instrument resumes power transmission (intermittent power transmission), and transmits the recharge detection command to the power-receiving-side instrument (step S8). Specifically, the power-transmitting-side instrument generates a frame that instructs detection of the recharge state, and transmits the generated frame to the power-receiving-side instrument by frequency modulation. The power-transmitting-side instrument then waits for expiration of the second period (timeout wait period) T2 (i.e., waits for a timeout to occur) (step S9). Specifically, the power-transmitting-side instrument waits for the power-receiving-side instrument to operate upon cancellation of the reset state due to intermittent power transmission and transmit the recharge command. The power-transmitting-side instrument performs removal detection until the second period T2 expires (step S10). When the power-transmitting-side instrument has detected removal, the power-transmitting-side instrument transitions to the normal standby mode. The power-transmitting-side instrument monitors whether or not the recharge command has been received from the power-receiving-side instrument until the second period T2 expires (step S11). When the power-transmitting-side instrument has not received the recharge command from the power-receiving-side instrument, the power-transmitting-side instrument returns to the step S9. When the second period T2 has elapsed (i.e., timeout has occurred), the power-transmitting-side instrument returns to the step S7, and again stops power transmission to the power-receiving-side instrument. The power-transmitting-side instrument performs intermittent power transmission after the power transmission suspension period T1 has expired, and again transmits the recharge detection command to the power-receiving-side instrument (step S8). As described above, the power-transmitting-side instrument repeatedly stops power transmission and performs intermittent power transmission until the power-transmitting-side instrument receives the recharge command from the power-receiving-side instrument.

When the power-transmitting-side instrument has received the recharge command from the power-receiving-side instrument in the step S11, the power-transmitting-side instrument returns to the step S2, and resets the full-charge flag FC to "0". The power-transmitting-side instrument the resumes normal power transmission for recharging the battery 94 (step S3). As a result, the battery 94 of which the voltage has decreased starts to be recharged.

The power-receiving-side process is as follows. When the power-transmitting-side instrument has completed ID authentication, the power-receiving-side instrument starts normal power receiving (steps S21 and S22). The power-receiving-side instrument then determines whether or not the battery 94 has been fully charged. When the battery 94 has been fully charged, the power-receiving-side instrument transmits the full-charge command to the power-transmitting-side instrument (steps S23 and S24). Specifically, the power-receiving-side instrument generates a frame which indicates that the battery 94 has been fully charged, and transmits the generated frame to the power-transmitting-side instrument by load modulation. The power-transmitting-side instrument sets the full-charge flag FC to "1", and stops power transmission (steps S6 and 87). The power-receiving-side instrument stops outputting the voltage VOUT to the charge control device 92 (step S25). Specifically, the power-receiving-side instrument causes the transistors TB2 and TB1 shown in FIG. 2 to be turned OFF to electrically disconnect the load 90. More specifically, the control circuit 52 causes the transistor TB2 to be turned OFF by setting the signal P1Q at the H level.

When the power-transmitting-side instrument has stopped power transmission in the step S7 in FIG. 11, the power-receiving-side instrument is reset since power is not supplied to the power-receiving-side instrument. When the power-transmitting-side instrument has then started intermittent power transmission, power is supplied to the power-receiving-side instrument. Therefore, the power-receiving-side power supply voltage rises, whereby the reset state is canceled (step S26). The power-receiving-side instrument then determines whether or not the recharge detection command has been received (step S27). When the power-receiving-side instrument has not received the recharge detection command, the power-receiving-side instrument transitions to a normal ID authentication process. Specifically, a normal standby mode process is performed.

When the power-receiving-side instrument has received the recharge detection command, the power-receiving-side instrument determines whether or not the battery 94 requires recharging (step S28). Specifically, the power-receiving-side instrument determines whether or not the battery voltage VBAT is lower than the recharge voltage (e.g., 3.9 V). When the power-receiving-side instrument has determined that the battery 94 does not require recharging, the power-receiving-side instrument does not respond to the power-transmitting-side instrument. Therefore, the power-transmitting-side instrument determines that a timeout has occurred in the step S9, and stops power transmission so that the power-receiving-side instrument is reset.

When the power-receiving-side instrument has determined that the battery 94 requires recharging in the step S28, the power-receiving-side instrument transmits the recharge command (step S29). When the power-transmitting-side instrument has received the recharge command, the power-transmitting-side instrument resets the full-charge flag FC to "0" and resumes normal power transmission (steps S2 and S3). The power-receiving-side instrument also resumes normal power receiving (step S22) so that the post-full-charge standby mode is canceled.

According to this embodiment, when the power-receiving-side instrument has detected that the battery 94 has been fully charged, the power-transmitting-side instrument stops power transmission (step S7). The power-receiving-side instrument stops outputting the voltage VOUT to the charge control device 92 (step S25), and transitions to the post-full-charge standby mode. In the post-full-charge standby mode, since the power-transmitting-side instrument stops power transmission, the power reception control device 50 is reset. Moreover, since the power-receiving-side instrument stops outputting the voltage VOUT, the charge control device 92 is also reset. Therefore, a standby current that flows through the power reception control device 50 and the charge control device 92 can be significantly reduced so that power consumption can be reduced.

According to this embodiment, after the power-receiving-side instrument has been reset, the power-transmitting-side instrument performs intermittent power transmission and transmits the recharge detection command (step S8). The power-receiving-side instrument monitors the recharge state based on the received recharge detection command when the reset state has been canceled (steps S27 and S28). When the power-receiving-side instrument has determined that recharging is necessary, the power-receiving-side instrument transmits the recharge command (step S29).

Specifically, since the power-receiving-side instrument is reset when power transmission has been stopped, the power-receiving-side instrument cannot store information relating to the full-charge state or the recharge state. On the other hand, the power-transmitting-side instrument can store such information. This embodiment focuses on this point. Specifically, the power-transmitting-side instrument transmits the recharge detection command to the power-receiving-side instrument in the intermittent power transmission period after power transmission has been stopped. This enables the power-receiving-side instrument released from the reset state to start monitoring the recharge state based on the recharge detection command from the power-transmitting-side instrument as a trigger, even if the power-receiving-side instrument does not store the information relating to the full-charge state or the recharge state. When the power-receiving-side instrument has determined that recharging is necessary, the power-receiving-side instrument can notify the power-transmitting-side instrument that recharging is necessary by transmitting the recharge command. This makes it possible to appropriately recharge the battery 94 after the battery 94 has been fully charged.

When the power-transmitting-side instrument has not received the recharge command within the period T2 so that a timeout has occurred, the power-transmitting-side instrument stops power transmission (steps S9 and S7). Specifically, the power-transmitting-side instrument repeatedly stops power transmission and performs intermittent power transmission until the power-transmitting-side instrument receives the recharge command. Therefore, it suffices that the power-receiving-side instrument operate only in the intermittent power transmission period. The standby current in the post-full-charge standby mode can be significantly reduced by sufficiently increasing the power transmission suspension period T1. Therefore, the battery 94 can be optimally recharged while minimizing unnecessary power consumption.

Fourth Embodiment

This embodiment illustrates detection of removal (leave) of the power-receiving-side instrument (secondary-side instrument) after full-charging. Whether or not the power-receiving-side instrument has been removed after full-charging may be detected by causing the power transmitting device 10 to perform intermittent power transmission to the power receiving device 40, and determining whether or not the power transmitting device 10 can detect the ID authentication information from the power receiving device 40, for example. Specifically, normal power transmission is stopped when the battery 94 has been fully charged. Therefore, the charge control device 92 (see FIG. 2) provided in the load 90 is reset and returns to the initial state. When the power transmitting device 10 has performed intermittent power transmission at given intervals after the battery has been fully charged, the power receiving device 40 that has received power by intermittent power transmission operates, and transmits the ID authentication information relating to the power-receiving-side instrument 510 (or the power receiving device 40) to the power transmitting device 10 (see the step S4 in FIG. 4). Therefore, when the power-receiving-side instrument 510 has not been removed, the ID authentication information should be transmitted to the power transmitting device 10 from the power receiving device 40 within a given period after intermittent power transmission has started. When the ID authentication information has not been transmitted from the power receiving device 40 within the given period, the power transmitting device 10 determines that the power-receiving-side instrument 510 has been removed. Note that removal of the power-receiving-side instrument 510 can also be detected by observing the alternating-current waveform at the coil end of the primary coil L1 (i.e., the amplitude of the alternating-current voltage), as shown in FIG. 14.

In this embodiment, intermittent power transmission for removal detection is performed in addition to intermittent power transmission for recharge necessity detection. The first cycle T10 of removal detection after full-charging is set at a value (e.g., 5 seconds) longer than the cycle (e.g., 0.3 seconds) of temporary power transmission to suppress an increase in power consumption. Since the frequency of recharge necessity detection after full-charging can be further reduced, the second cycle T20 of full-charge detection is set at a value (e.g., 10 minutes) longer than the first cycle T10. This enables secondary-side instrument installation detection, recharge necessity detection after full-charging, and removal detection after full-charging to be achieved in optimum cycles while minimizing power consumption.

As described above, at least one embodiment of the invention can provide non-contact power transmission technology that is highly convenient to the user and can reduce power consumption. At least one embodiment of the invention can provide highly reliable non-contact power transmission technology provided with appropriate safety measures. At least one embodiment of the invention can provide non-contact power transmission technology that reduces the size and cost of a non-contact power transmission system by reducing the number of parts.

According to at least one embodiment of the invention, the following main effects can be obtained. Note that the following effects are not necessarily achieved at the same time. Accordingly, the following effects do not in any way limit the technical scope of the invention.

(1) Since the non-contact power transmission system according to the invention automatically detects installation of the power-receiving-side instrument and starts normal power transmission, the user need not operate a switch or the like. Therefore, convenience to the user is improved.

(2) Since normal power transmission is performed after ID authentication, normal power transmission is not performed for an instrument that is inappropriate for the system. Therefore, reliability and safety are improved.

(3) Various detection operations (i.e., removal detection, metal foreign object detection, takeover state detection based on power-receiving-side regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety).

(4) The safety of the system is significantly improved by utilizing the measures against takeover heat generation in addition to the normal foreign object measures. Moreover, since the power receiving device reduces the load when performing intermittent load modulation (regular load modulation) for takeover detection, the power transmitting device can reliably detect a change in load. Therefore, the takeover state detection accuracy can be improved.

(5) Since recharge management (and removal detection) is automatically performed after full-charging, the battery is necessarily maintained in a full-charge state even is the power-receiving-side instrument is placed on the charger for a long period of time. Therefore, the user can safely utilize the non-contact power transmission system, and is very satisfied.

(6) The non-contact power transmission system according to the invention has the automatic mode (automatic execution mode). In the automatic mode, all of the above-described operations are automatically performed. Therefore, a highly convenient non-contact power transmission system that does not impose a burden on the user is implemented.

(7) Since detection of installation of the power-receiving-side instrument, recharge management after full-charging, and removal detection after full-charging are performed based on intermittent power transmission from the power transmitting device, power consumption is reduced. Therefore, a non-contact power transmission system with low power consumption is implemented. The power consumption of the non-contact power transmission system can be further reduced by individually optimizing the cycle of intermittent power transmission corresponding to the objective.

(8) The size and the cost of the non-contact power transmission system can be reduced due to a simple device configuration.

Although only some embodiments of the invention have been described in detail above, those skilled in the art would readily appreciate that many modifications are possible in the embodiments without materially departing from the novel teachings and advantages of the invention. Specifically, various modifications are possible without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. Any combinations of the embodiments and the modifications are also included within the scope of the invention.

The configurations and the operations of the power transmission control device, the power transmitting device, the power reception control device, and the power receiving device, and the power-receiving-side load detection method employed for the power transmitting device are not limited to those described relating to the above embodiments. Various modifications and variations may be made. The above embodiments have been described taking an example in which power transmission after full-charging is performed intermittently. Note that continuous power transmission with a reduced amount of power (power-saving power transmission) may be performed instead of intermittent power transmission. Since power-saving power transmission is continuous power transmission, power consumption increases to some extent as compared with intermittent power transmission. However, since the charge control device 92 provided in the load 90 always operates due to continuous power transmission even after full-charging, recharge necessity determination and removal detection can be continuously performed.

The invention achieves an effect of providing a convenient and highly reliable non-contact power transmission system with low power consumption. Therefore, the invention is useful for a power transmission control device (power transmission control IC), a power transmitting device (e.g., IC module), a non-contact power transmission system, an electronic instrument (e.g., portable terminal and charger), and the like. Note that the term "portable terminal" includes a portable telephone terminal, a PDA terminal, and a portable computer terminal.

The invention may also be applied to other power transmission systems (e.g., a cable power transmission system and a point-contact-type power transmission system that transmits power through a contact point) in addition to the non-contact power transmission system.

What is claimed is:

1. A power transmission control device provided in a power transmitting device of a non-contact power transmission system, the non-contact power transmission system performing non-contact power transmission from the power transmitting device to a power receiving device via a primary coil and a secondary coil that are electromagnetically coupled, the power transmission control device comprising:
   a power-transmitting-side control circuit that controls power transmission to the power receiving device,
   the power-transmitting-side control circuit causing the power transmitting device to perform intermittent temporary power transmission,
   the power receiving device that has received the temporary power transmission performing position detection that checks whether or not a power-receiving-side instrument that includes the power receiving device is placed at an appropriate position,
   the power receiving device transmitting an ID authentication frame to the power transmitting device when the power-receiving-side instrument is placed at the appropriate position,
   the power-transmitting-side control circuit performing an ID authentication process based on the ID authentication frame and transmitting a permission frame to the power receiving device when the ID authentication frame has been detected within a given period of time after the intermittent temporary power transmission and the ID authentication has succeeded,
   the power-transmitting-side control circuit causing the power transmitting device to continuously perform the intermittent temporary power transmission when the ID authentication frame has not been detected within the given period of time after the intermittent temporary power transmission,
   the power receiving device checking the permission frame and transmitting a start frame to the power transmitting device to start continuous normal power transmission,
   the power-transmitting-side control circuit causing the power transmitting device to perform the continuous normal power transmission to the power receiving device when the start frame has been detected.

2. A power transmitting device comprising:
   the power transmission control device as defined in claim 1; and
   a power transmitting section that generates an alternating-current voltage and supplies the alternating-current voltage to the primary coil.

3. An electronic instrument comprising the power transmitting device as defined in claim 2.

4. A non-contact power transmission system comprising a power transmitting device and a power receiving device, the non-contact power transmission system performing non-contact power transmission from the power transmitting device to the power receiving device via a primary coil and a secondary coil that are electromagnetically coupled, the power transmitting device including a power-transmitting-side control circuit that controls power transmission to the power receiving device based on an induced voltage in the primary coil;

the power receiving device including a power supply control section that controls power supply to a load, and a power reception control device that includes a power-receiving-side control circuit that controls the power receiving device; and the power-transmitting-side control circuit of the power transmitting device causing the power transmitting device to perform intermittent temporary power transmission, the power receiving device that has received the power due to the temporary power transmission performing position detection that checks whether or not a power-receiving-side instrument that includes the power receiving device is placed at an appropriate position, the power receiving device transmitting an ID authentication frame to the power transmitting device when the power-receiving-side instrument is placed at the appropriate position, the power-transmitting-side control circuit performing an ID authentication process based on the ID authentication frame and transmitting a permission frame to the power receiving device when the ID authentication frame has been detected within a given period of time after the intermittent temporary power transmission and the ID authentication has succeed, the power-transmitting-side control circuit causing the power transmitting device to continuously perform the intermittent temporary power transmission when the ID authentication frame has not been detected within the given period of time after the intermittent temporary power transmission, the power receiving device checking the permission frame and transmitting a start frame to the power transmitting device to start continuous normal power transmission, the power-transmitting-side control circuit causing the power transmitting device to perform the continuous normal power transmission to the power receiving device when the start frame has been detected.

5. A power transmission control method that controls power transmission from a power transmitting device to a power receiving device, the method comprising:

causing the power transmitting device to perform intermittent temporary power transmission;

causing the power receiving device that has received the intermittent temporary power transmission to perform position detection that checks whether or not a power-receiving-side instrument that includes the power receiving device is placed at an appropriate position, causing the power receiving device to transmit an ID authentication frame to the power transmitting device when the power-receiving-side instrument is placed at the appropriate position;

causing the power transmitting device to perform an ID authentication process based on the ID authentication frame and to transmit a permission frame to the power receiving device when the ID authentication frame has been detected within a given period of time after the intermittent temporary power transmission and the ID authentication has succeeded;

causing the power transmitting device to continuously perform the intermittent temporary power transmission when the ID authentication frame has not been detected within the given period of time after the intermittent temporary power transmission;

causing the power receiving device to check the permission frame and to transmit a start frame to the power transmitting device to start continuous normal power transmission; and causing the power transmitting device to perform the continuous normal power transmission to the power receiving device when the start frame has been detected.

* * * * *